US008475254B2

(12) United States Patent
Acres

(10) Patent No.: US 8,475,254 B2
(45) Date of Patent: *Jul. 2, 2013

(54) LINKED GAME PLAY ON GAMING DEVICES

(75) Inventor: John F. Acres, Las Vegas, NV (US)

(73) Assignee: Patent Investment & Licensing Company, Las Vegas, NV (US)

( * ) Notice: Subject to any disclaimer, the term of this patent is extended or adjusted under 35 U.S.C. 154(b) by 559 days.

This patent is subject to a terminal disclaimer.

(21) Appl. No.: 12/648,053

(22) Filed: Dec. 28, 2009

(65) Prior Publication Data

US 2011/0159940 A1 Jun. 30, 2011

(51) Int. Cl.
*A63F 9/24* (2006.01)
*A63F 13/00* (2006.01)

(52) U.S. Cl.
USPC .................. 463/13; 463/16; 463/17; 463/18; 463/19; 463/20

(58) Field of Classification Search
USPC ................................................ 463/13, 16–20
See application file for complete search history.

(56) References Cited

U.S. PATENT DOCUMENTS

| | | | |
|---|---|---|---|
| 4,391,444 | A | 7/1983 | Bromley |
| 4,652,998 | A | 3/1987 | Koza et al. |
| 4,861,041 | A | 8/1989 | Jones et al. |
| 5,159,549 | A | 10/1992 | Hallman, Jr. et al. |
| 5,249,805 | A | 10/1993 | Neil et al. |
| 5,380,012 | A | 1/1995 | Jones et al. |
| 5,741,183 | A | 4/1998 | Acres et al. |
| 5,766,076 | A | 6/1998 | Pease et al. |
| 5,851,148 | A | 12/1998 | Brune et al. |
| 5,923,306 | A | 7/1999 | Smith et al. |
| 6,022,274 | A | 2/2000 | Takeda et al. |
| 6,154,186 | A | 11/2000 | Smith et al. |
| 6,155,926 | A | 12/2000 | Miyamoto et al. |
| 6,186,505 | B1 | 2/2001 | Perrie et al. |
| 6,244,958 | B1 | 6/2001 | Acres |
| 6,320,110 | B1 | 11/2001 | Ishikawa et al. |
| 6,474,647 | B1 | 11/2002 | Zakhar |
| 6,511,376 | B2 | 1/2003 | Walker et al. |
| 6,612,927 | B1 | 9/2003 | Slomiany et al. |
| 6,758,751 | B2 | 7/2004 | Soltys et al. |

(Continued)

FOREIGN PATENT DOCUMENTS

| | | |
|---|---|---|
| CA | 2 564 433 A1 | 2/2006 |
| JP | 10-301475 | 11/1998 |

(Continued)

*Primary Examiner* — Arthur O. Hall
*Assistant Examiner* — Jasson Yoo
(74) *Attorney, Agent, or Firm* — Marger Johnson & McCollom PC

(57) ABSTRACT

Embodiments of the present concept provide gaming devices configured for linked game play. First and second gaming devices that are separately playable by first and second players are electronically linked so that a gaming event being played at the first gaming device may also be being played at the second gaming device. Also provided is a method of sharing game play across multiple gaming devices, where the method includes receiving a wager from a first player at a first gaming device, receiving a wager from a second player at a second gaming device, initiating a gaming event that is displayed at the first and second gaming devices, and awarding prizes associated with gaming outcomes displayed at the first and second gaming devices. These and other arrangements of the present concept may allow cooperative or competitive game play between the first and second player.

15 Claims, 17 Drawing Sheets

U.S. PATENT DOCUMENTS

| | | | |
|---|---|---|---|
| 6,758,757 | B2 | 7/2004 | Luciano, Jr. et al. |
| 6,764,397 | B1 | 7/2004 | Robb |
| 6,780,109 | B2 | 8/2004 | Kaminkow |
| 6,790,141 | B2 | 9/2004 | Muir |
| 6,793,577 | B1 | 9/2004 | Wilkins et al. |
| 6,811,486 | B1 | 11/2004 | Luciano, Jr. |
| 6,902,478 | B2 | 6/2005 | McClintic |
| 6,921,333 | B2 | 7/2005 | Taguchi |
| 6,923,446 | B2 | 8/2005 | Snow |
| 6,926,607 | B2 | 8/2005 | Slomiany et al. |
| 6,981,635 | B1 | 1/2006 | Hughs-Baird et al. |
| 7,040,622 | B2 | 5/2006 | Sebesta et al. |
| 7,255,351 | B2 | 8/2007 | Yoseloff et al. |
| 7,255,644 | B2 | 8/2007 | Duhamel |
| 7,748,714 | B2 * | 7/2010 | Nicely et al. .................. 273/292 |
| 8,192,267 | B2 * | 6/2012 | Acres .............................. 463/13 |
| 2001/0052671 | A1 * | 12/2001 | Stern ............................. 273/292 |
| 2002/0055381 | A1 | 5/2002 | Tarantino |
| 2002/0072412 | A1 | 6/2002 | Young et al. |
| 2002/0125637 | A1 | 9/2002 | Leis |
| 2002/0132660 | A1 | 9/2002 | Taylor |
| 2002/0151338 | A1 | 10/2002 | Taguchi |
| 2002/0160827 | A1 | 10/2002 | Slomiany et al. |
| 2002/0198052 | A1 | 12/2002 | Soltys et al. |
| 2003/0032474 | A1 | 2/2003 | Kaminkow |
| 2003/0036425 | A1 | 2/2003 | Kaminkow et al. |
| 2003/0040357 | A1 | 2/2003 | Baerlocher |
| 2003/0064807 | A1 * | 4/2003 | Walker et al. ................... 463/42 |
| 2003/0100360 | A1 | 5/2003 | Manfredi et al. |
| 2003/0114233 | A1 | 6/2003 | Hiei |
| 2003/0168806 | A1 | 9/2003 | Nigale |
| 2003/0228902 | A1 | 12/2003 | Walker et al. |
| 2004/0097287 | A1 | 5/2004 | Postrel |
| 2004/0227288 | A1 | 11/2004 | Sebesta et al. |
| 2004/0242297 | A1 * | 12/2004 | Walker et al. ................... 463/13 |
| 2004/0254809 | A1 | 12/2004 | Teicher |
| 2005/0009601 | A1 | 1/2005 | Manfredi et al. |
| 2005/0014554 | A1 | 1/2005 | Walker et al. |
| 2005/0032563 | A1 | 2/2005 | Sines |
| 2005/0037841 | A1 | 2/2005 | de Waal et al. |
| 2005/0040601 | A1 | 2/2005 | Yoseloff et al. |
| 2005/0054430 | A1 | 3/2005 | Pitman et al. |
| 2005/0054439 | A1 | 3/2005 | Rowe et al. |
| 2005/0059459 | A1 | 3/2005 | Dunn et al. |
| 2005/0059467 | A1 | 3/2005 | Saffari et al. |
| 2005/0059468 | A1 | 3/2005 | Cannon |
| 2005/0059470 | A1 | 3/2005 | Cannon |
| 2005/0059471 | A1 | 3/2005 | Cannon |
| 2005/0060050 | A1 | 3/2005 | Baerlocher |
| 2005/0064932 | A1 | 3/2005 | Cannon |
| 2005/0070359 | A1 | 3/2005 | Rodriquez et al. |
| 2005/0073102 | A1 | 4/2005 | Yoseloff et al. |
| 2005/0075161 | A1 | 4/2005 | McGlone et al. |
| 2005/0082750 | A1 | 4/2005 | Grauzer et al. |
| 2005/0082760 | A1 | 4/2005 | Yoseloff et al. |
| 2005/0085287 | A1 | 4/2005 | Sines |
| 2005/0119042 | A1 | 6/2005 | Chamberlain et al. |
| 2005/0127606 | A1 | 6/2005 | Snow et al. |
| 2005/0153759 | A1 | 7/2005 | Varley |
| 2005/0187001 | A1 | 8/2005 | Fishel |
| 2005/0187014 | A1 | 8/2005 | Saffari et al. |
| 2005/0211764 | A1 | 9/2005 | Barcelou |
| 2005/0218601 | A1 | 10/2005 | Capellan |
| 2005/0250578 | A1 | 11/2005 | Solmiany et al. |
| 2005/0275167 | A1 | 12/2005 | Wilson |
| 2006/0014577 | A1 | 1/2006 | Snow |
| 2006/0014582 | A1 | 1/2006 | Harris et al. |
| 2006/0014586 | A1 | 1/2006 | Gatto et al. |
| 2006/0040717 | A1 | 2/2006 | Lind et al. |
| 2006/0040727 | A1 | 2/2006 | Lind et al. |
| 2006/0040735 | A1 | 2/2006 | Baerlocher |
| 2006/0052160 | A1 | 3/2006 | Saffari et al. |
| 2006/0063581 | A1 | 3/2006 | Harris et al. |
| 2006/0082063 | A1 | 4/2006 | Moody et al. |
| 2006/0084505 | A1 | 4/2006 | Yoseloff et al. |
| 2006/0084506 | A1 | 4/2006 | Yoseloff et al. |
| 2006/0089196 | A1 | 4/2006 | Parham et al. |
| 2006/0121971 | A1 | 6/2006 | Slomiany et al. |
| 2006/0125177 | A1 | 6/2006 | Gvishi |
| 2006/0135245 | A1 | 6/2006 | Hedrick et al. |
| 2006/0178202 | A1 | 8/2006 | Hughes et al. |
| 2006/0189386 | A1 | 8/2006 | Rosenberg |
| 2006/0205468 | A1 | 9/2006 | Saffari et al. |
| 2006/0211496 | A1 | 9/2006 | Manz |
| 2006/0224667 | A1 | 10/2006 | Amir et al. |
| 2006/0244216 | A1 | 11/2006 | O'Hagan |
| 2006/0246976 | A1 | 11/2006 | Sines |
| 2006/0247042 | A1 | 11/2006 | Walker et al. |
| 2006/0247053 | A1 | 11/2006 | Mattila |
| 2006/0252546 | A1 | 11/2006 | Castellari et al. |
| 2006/0255541 | A1 | 11/2006 | McBride |
| 2006/0284376 | A1 | 12/2006 | Snow |
| 2006/0284378 | A1 | 12/2006 | Snow et al. |
| 2007/0026936 | A1 | 2/2007 | Gatto et al. |
| 2007/0054738 | A1 | 3/2007 | Muir |
| 2007/0060314 | A1 | 3/2007 | Baerlocher et al. |
| 2007/0060321 | A1 | 3/2007 | Vasquez et al. |
| 2007/0077985 | A1 | 4/2007 | Walker et al. |
| 2007/0087798 | A1 | 4/2007 | McGucken |
| 2007/0087835 | A1 | 4/2007 | Van Luchene |
| 2007/0102877 | A1 | 5/2007 | Personius et al. |
| 2007/0111784 | A1 | 5/2007 | Van Luchene |
| 2007/0117623 | A1 | 5/2007 | Nelson et al. |
| 2007/0117637 | A1 | 5/2007 | Morgan et al. |
| 2007/0129144 | A1 | 6/2007 | Katz et al. |
| 2007/0155460 | A1 | 7/2007 | Burnside et al. |
| 2007/0155462 | A1 | 7/2007 | O'Halloran et al. |
| 2007/0155465 | A1 | 7/2007 | Walker et al. |
| 2007/0167210 | A1 | 7/2007 | Kelly et al. |
| 2007/0167226 | A1 | 7/2007 | Kelly et al. |
| 2007/0170651 | A1 | 7/2007 | Matusek et al. |
| 2007/0218968 | A1 | 9/2007 | Snow |

FOREIGN PATENT DOCUMENTS

| | | | |
|---|---|---|---|
| WO | WO 98/51384 | A1 | 11/1998 |
| WO | WO 02/11083 | A2 | 2/2002 |
| WO | WO 03/026763 | A1 | 4/2003 |
| WO | WO 2005/027060 | A2 | 3/2005 |
| WO | WO 2005/029423 | A1 | 3/2005 |
| WO | WO 2006/023416 | A2 | 3/2006 |
| WO | WO 2006/023907 | A2 | 3/2006 |
| WO | WO 2006/063054 | A2 | 6/2006 |
| WO | WO 2006/078219 | A1 | 7/2006 |
| WO | WO 2006/105592 | A1 | 10/2006 |
| WO | WO 2006/118849 | A1 | 11/2006 |
| WO | WO 2007/019381 | A2 | 2/2007 |
| WO | WO 2007/078654 | A2 | 7/2007 |
| WO | WO 2007/093000 | A1 | 8/2007 |

* cited by examiner

LINKED GAME PLAY ON GAMING DEVICES

FIELD OF THE INVENTION

This disclosure relates generally to gaming devices, and more particularly to gaming devices configured for linked game play.

BACKGROUND

Gaming has conventionally been a social activity for many players. That is, part of the enjoyment of gaming is sharing an exciting experience with others. This can easily be seen at craps tables, sports books, poker tournaments, and other types of gaming. With electronic gaming devices, such as slot machines, this social interaction can be hampered somewhat by the player-machine setup where individual devices typically support only play by a single player. Although players may select gaming machines adjacent to one another, or adjacent gaming stations at a multi-player electronic table, multiple players, e.g., a couple, may not be able to share a casino gambling experience as much as they might like. For example, if the couple selects adjacent gaming machines to play so that each can keep an eye on the other's betting, playing, and any jackpots or bonuses that might result, they typically cannot participate in the other's gaming experience or even focus on their own gaming experience. While this distraction may prevent the other player from fully engaging with his or her own game, it at least provides some semblance of a shared gaming experience.

Gaming tournaments in which multiple players compete against one another are known. In such tournaments, each player bets his or her own money and competes with other players to see who can win the most. While the tournament format involves multiple players, it is typically based strictly on competition, i.e., each player bets his or her own money on separate games to compete against other players whom they may or may not know. In tournaments, however, each competitor is playing an individual game with only final numerical totals being compared between the players Hence, while gaming tournaments provide some interaction between players, this interaction is limited in its ability to provide a rewarding shared gaming experience. Further, while tournaments provide some semblance of competition, this competition can be tempered by the player's intense focus on his or her own gaming results.

Community betting has also increased in popularity. With community betting, two or more players pool their money to play a single gaming machine. With this technique, the players typically all stand near a single gaming device where they deposit their pooled money and take turns initiating the gaming device. Typically, this type of betting is popular for large jackpot type machines, such as Mega-Bucks®, where a max bet is needed to be eligible for the big prize and the prize is large enough that the players can split any winnings and still feel successful. While community betting provides a shared gaming experience, it can quickly lead to boredom by the player not currently placing the wagers. In addition, the shared gaming experience is usually limited to the bond of the pooled money. Hence, there is usually no direct competition or way to compare the wagering results of one player versus the wagering results of the other players.

DETAILED DESCRIPTION

Figure 1A:
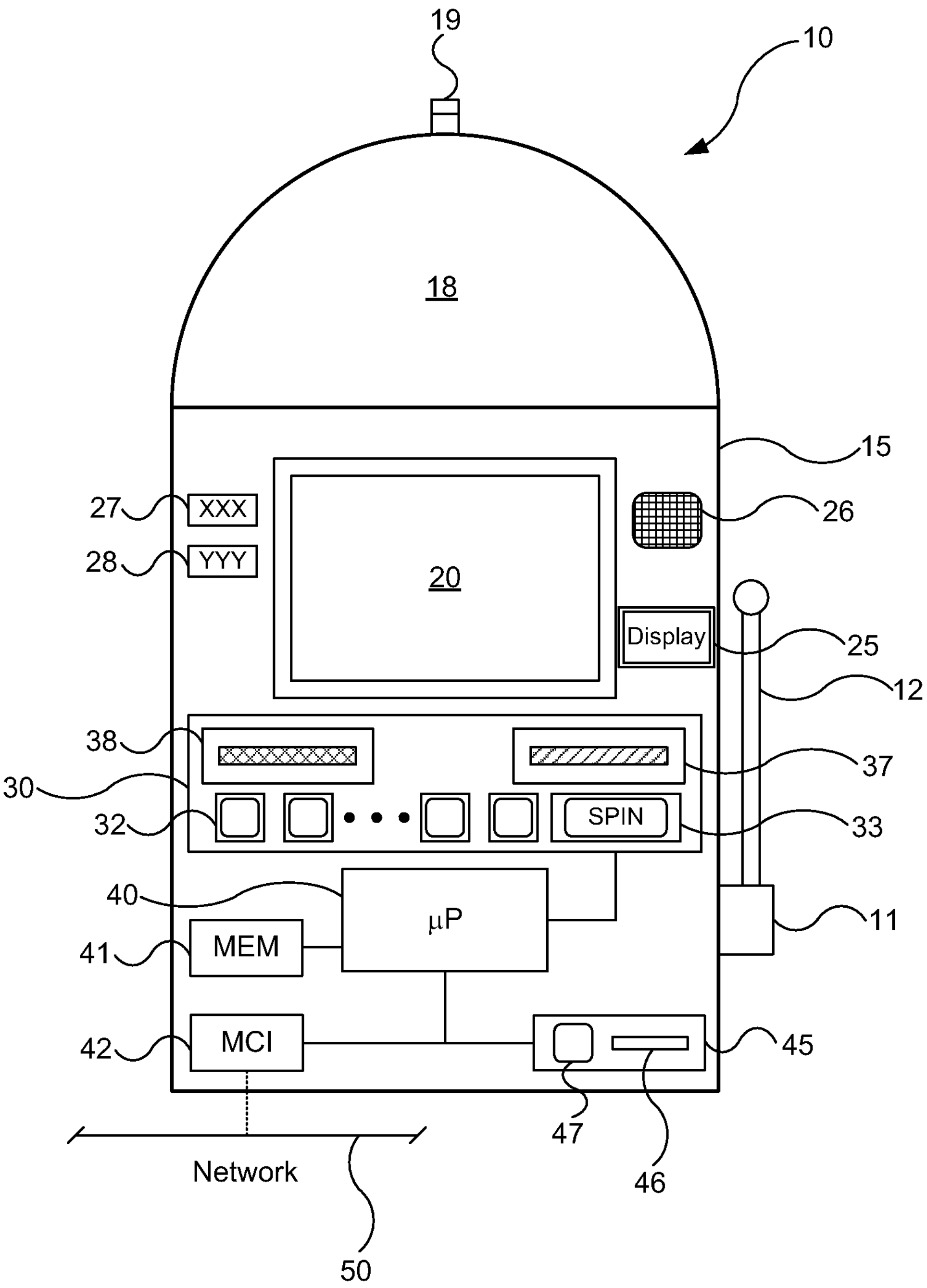
FIG. 1A is a functional block diagram that illustrates a gaming device according to embodiments of the invention.
Figure 1B:
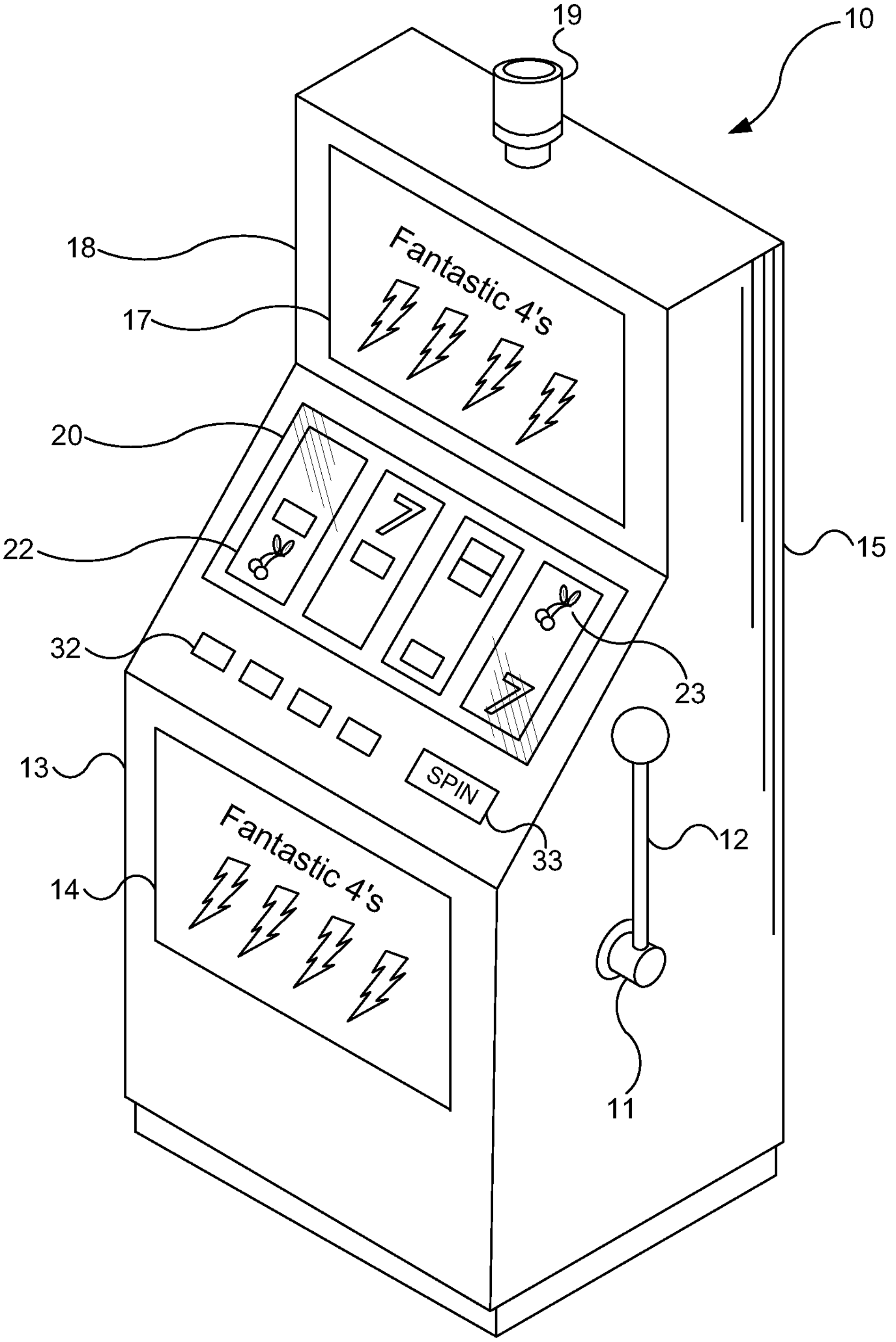
FIG. 1B is an isometric view of the gaming device illustrated in FIG. 1A.

FIGS. 1A and 1B illustrate example gaming devices according to embodiments of the invention.

Referring to FIGS. 1A and 1B, a gaming device 10 is an electronic gaming machine. Although an electronic gaming machine or "slot" machine is illustrated, various other types of devices may be used to wager monetarily based credits on a game of chance in accordance with principles of the invention. The term "electronic gaming device" is meant to include various devices such as electro-mechanical spinning-reel type slot machines, video slot machines, and video poker machines, for instance. Other gaming devices may include computer-based gaming machines, wireless gaming devices, multi-player gaming stations, modified personal electronic gaming devices (such as cell phones), personal computers, server-based gaming terminals, and other similar devices. Although embodiments of the invention will work with all of the gaming types mentioned, for ease of illustration the present embodiments will be described in reference to the electronic gaming machine 10 shown in FIGS. 1A and 1B.

The gaming device 10 includes a cabinet 15 housing components to operate the gaming device 10. The cabinet 15 may include a gaming display 20, a base portion 13, a top box 18, and a player interface panel 30. The gaming display 20 may include mechanical spinning reels (FIG. 2A), a video display (FIGS. 2B and 2C), or a combination of both spinning reels and a video display (not shown). The gaming cabinet 15 may also include a credit meter 27 and a coin-in or bet meter 28. The credit meter 27 may indicate the total number of credits remaining on the gaming device 10 that are eligible to be wagered. In some embodiments, the credit meter 27 may reflect a monetary unit, such as dollars. However, it is often preferable to have the credit meter 27 reflect a number of 'credits,' rather than a monetary unit. The bet meter 28 may indicate the amount of credits to be wagered on a particular game. Thus, for each game, the player transfers the amount that he or she wants to wager from the credit meter 27 to the bet meter 28. In some embodiments, various other meters may be present, such as meters reflecting amounts won, amounts paid, or the like. In embodiments where the gaming display 20 is a video monitor, the information indicated on the credit meters may be shown on the gaming display itself 20 (FIG. 2B).

The base portion 13 may include a lighted panel 14, a coin return (not shown), and a gaming handle 12 operable on a partially rotating pivot joint 11. The game handle 12 is traditionally included on mechanical spinning-reel games, where the handle may be pulled toward a player to initiate the spinning of reels 22 after placement of a wager. The top box 18 may include a lighted panel 17, a video display (such as an LCD monitor), a mechanical bonus device (not shown), and a candle light indicator 19. The player interface panel 30 may include various devices so that a player can interact with the gaming device 10.

The player interface panel 30 may include one or more game buttons 32 that can be actuated by the player to cause the gaming device 10 to perform a specific action. For example, some of the game buttons 32 may cause the gaming device 10 to bet a credit to be wagered during the next game, change the number of lines being played on a multi-line game, cash out the credits remaining on the gaming device (as indicated on the credit meter 27), or request assistance from casino personnel, such as by lighting the candle 19. In addition, the player interface panel 30 may include one or more game actuating buttons 33. The game actuating buttons 33 may initiate a game with a pre-specified amount of credits. On some gaming devices 10 a "Max Bet" game actuating button 33 may be included that places the maximum credit wager on a game and initiates the game. The player interface panel 30 may further include a bill acceptor 37 and a ticket printer 38. The bill acceptor 37 may accept and validate paper money or previously printed tickets with a credit balance. The ticket printer 38 may print out tickets reflecting the balance of the credits that remain on the gaming device 10 when a player cashes out by pressing one of the game buttons 32 programmed to cause a 'cashout.' These tickets may be inserted into other gaming machines or redeemed at a cashier station or kiosk for cash.

The gaming device 10 may also include one or more speakers 26 to transmit auditory information or sounds to the player. The auditory information may include specific sounds associated with particular events that occur during game play on the gaming device 10. For example, a particularly festive sound may be played during a large win or when a bonus is triggered. The speakers 26 may also transmit "attract" sounds to entice nearby players when the game is not currently being played.

The gaming device 10 may further include a secondary display 25. This secondary display 25 may be a vacuum fluorescent display (VFD), a liquid crystal display (LCD), a cathode ray tube (CRT), a plasma screen, or the like. The secondary display 25 may show any combination of primary game information and ancillary information to the player. For example, the secondary display 25 may show player tracking information, secondary bonus information, advertisements, or player selectable game options.

The gaming device 10 may include a separate information window (not shown) dedicated to supplying any combination of information related to primary game play, secondary bonus information, player tracking information, secondary bonus information, advertisements or player selectable game options. This window may be fixed in size and location or may have its size and location vary temporally as communication needs change. One example of such a resizable window is International Game Technology's "service window". Another example is Las Vegas Gaming Incorporated's retrofit technology which allows information to be placed over areas of the game or the secondary display screen at various times and in various situations.

The gaming device 10 includes a microprocessor 40 that controls operation of the gaming device 10. If the gaming device 10 is a standalone gaming device, the microprocessor 40 may control virtually all of the operations of the gaming devices and attached equipment, such as operating game logic stored in memory (not shown) as firmware, controlling the display 20 to represent the outcome of a game, communicating with the other peripheral devices (such as the bill acceptor 37), and orchestrating the lighting and sound emanating from the gaming device 10. In other embodiments where the gaming device 10 is coupled to a network 50, as described below, the microprocessor 40 may have different tasks depending on the setup and function of the gaming device. For example, the microprocessor 40 may be responsible for running the base game of the gaming device and executing instructions received over the network 50 from a bonus server or player tracking server. In a server-based gaming setup, the microprocessor 40 may act as a terminal to execute instructions from a remote server that is running game play on the gaming device.

The microprocessor 40 may be coupled to a machine communication interface (MCI) 42 that connects the gaming device 10 to a gaming network 50. The MCI 42 may be coupled to the microprocessor 40 through a serial connection, a parallel connection, an optical connection, or in some cases a wireless connection. The gaming device 10 may include memory 41 (MEM), such as a random access memory (RAM), coupled to the microprocessor 40 and which can be used to store gaming information, such as storing total coin-in statistics about a present or past gaming session, which can be communicated to a remote server or database through the MCI 42. The MCI 42 may also facilitate communication between the network 50 and the secondary display 25 or a player tracking unit 45 housed in the gaming cabinet 15.

The player tracking unit 45 may include an identification device 46 and one or more buttons 47 associated with the player tracking unit 45. The identification device 46 serves to identify a player, by, for example, reading a player-tracking device, such as a player tracking card that is issued by the casino to individual players who choose to have such a card. The identification device 46 may instead, or additionally, identify players through other methods. Player tracking systems using player tracking cards and card readers 46 are known in the art. Briefly summarizing such a system, a player registers with the casino prior to commencing gaming. The casino issues a unique player-tracking card to the player and opens a corresponding player account that is stored on a server or host computer, described below with reference to FIG. 3. The player account may include the player's name and mailing address and other information of interest to the casino in connection with marketing efforts. Prior to playing one of the gaming devices in the casino, the player inserts the player tracking card into the identification device 46 thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. The points may be displayed on the secondary display 25 or using other methods. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may use the secondary display 25 to access their player tracking account, such as to check a total number of points, redeem points for various services, make changes to their account, or download promotional credits to the gaming device 10. In other embodiments, the identification device 46 may read other identifying cards (such as driver licenses, credit cards, etc.) to identify a player and match them to a corresponding player tracking account. Although FIG. 1A shows the player tracking unit 45 with a card reader as the identification device 46, other embodiments may include a player tracking unit 45 with a biometric scanner, PIN code acceptor, or other methods of identifying a player to pair the player with their player tracking account.

A player typically plays the gaming device 10 by placing a wager and activating an input mechanism to initiate a game associated with the placed wager. As used herein, a gaming event refers to any activity that affects the calculation or display of a game outcome. Game events include interactions occurring between the gaming device 10, the player, and/or a connected game system. Example gaming events include a player inserting a player account card in a gaming device, a double-pay bonus time period activation, a first spinning reel coming to a stop, a player's input to hold a card in a poker hand, etc. A game refers to the calculation and completion of one game outcome. That is, a game includes a single game cycle that begins with the initiation of the wagered upon game and ends with the completion of all activities relating to the wager placed including any intervening bonuses. In other words, a game encompasses all gaming events dependent on a placed wager during an initiated game including all amounts due the player that are paid directly by the gaming machine, or as a manual payment by casino personnel to the player playing that gaming machine. For example, if an item was awarded as a result of a wager that could be saved and used later, the game would encompass the awarding of the item, which is part of the game outcome, but not the later use of that item since the later use would affect a different game outcome. A game session refers to one or more played games. For example, a game session for a particular player may include each game played on a specific gaming device, each game played between insertions of money or credits, each game played between an initial money or credit insertion and a cash-out or zeroing out of credits, each game played during a casino stay, or each game played over a predetermined time period. Alternatively, game sessions may refer to games played by multiple players over a specified time period or event period with respect to a particular gaming device or group of gaming devices.

The player may initially insert monetary bills or previously printed tickets with a credit value into the bill acceptor 37. The player may also put coins into a coin acceptor (not shown) or a credit, debit or casino account card into a card reader/authorizer (not shown). In other embodiments, stored player points or special 'bonus points' awarded to the player or accumulated and/or stored in a player account may be able to be substituted at or transferred to the gaming device 10 for credits or other value. For example, a player may convert stored loyalty points to credits or transfer funds from his bank account, credit card, casino account or other source of funding. The selected source of funding may be selected by the player at time of transfer, determined by the casino at the time of transfer or occur automatically according to a predefined selection process. One of skill in the art will readily see that this invention is useful with all gambling devices, regardless of the manner in which wager value-input is accomplished.

The credit meter 27 displays the numeric credit value of the money or other value inserted, transferred, or stored dependent on the denomination of the gaming device 10. That is, if the gaming device 10 is a nickel slot machine and a $20 bill inserted into the bill acceptor 37, the credit meter will reflect 400 credits or one credit for each nickel of the inserted twenty dollars. For gaming devices 10 that support multiple denominations, the credit meter 27 will reflect the amount of credits relative to the denomination selected. Thus, in the above example, if a penny denomination is selected after the $20 is inserted the credit meter will change from 400 credits to 2000 credits.

A wager may be placed by pushing one or more of the game buttons 32, which may be reflected on the bet meter 28. That is, the player can generally depress a "bet one" button (one of the buttons on the player interface panel 30, such as 32), which transfers one credit from the credit meter 27 to the bet meter 28. Each time the button 32 is depressed an additional single credit transfers to the bet meter 28 up to a maximum bet that can be placed on a single play of the electronic gaming device 10. The game may be initiated by pulling the gaming handle 12 or depressing the spin button 33. On some gaming devices 10, a "max bet" button (another one of the buttons 32 on the player interface panel 30) may be depressed to wager the maximum number of credits supported by the gaming device 10 and initiate a game.

If the game does not result in any winning combination, the process of placing a wager may be repeated by the player. Alternatively, the player may cash out any remaining credits on the credit meter 27 by depressing the "cash-out" button (another button 32 on the player interface panel 30), which causes the credits on the credit meter 27 to be paid out in the form of a ticket through the ticket printer 38, or may be paid out in the form of returning coins from a coin hopper (not shown) to a coin return tray.

If instead a winning combination (win) appears on the display 20, the award corresponding to the winning combination is immediately applied to the credit meter 27. For example, if the gaming device 10 is a slot machine, a winning combination of symbols 23 may land on a played payline on reels 22. If any bonus games are initiated, the gaming device 10 may enter into a bonus mode or simply award the player with a bonus amount of credits that are applied to the credit meter 27.

Figure 2A:
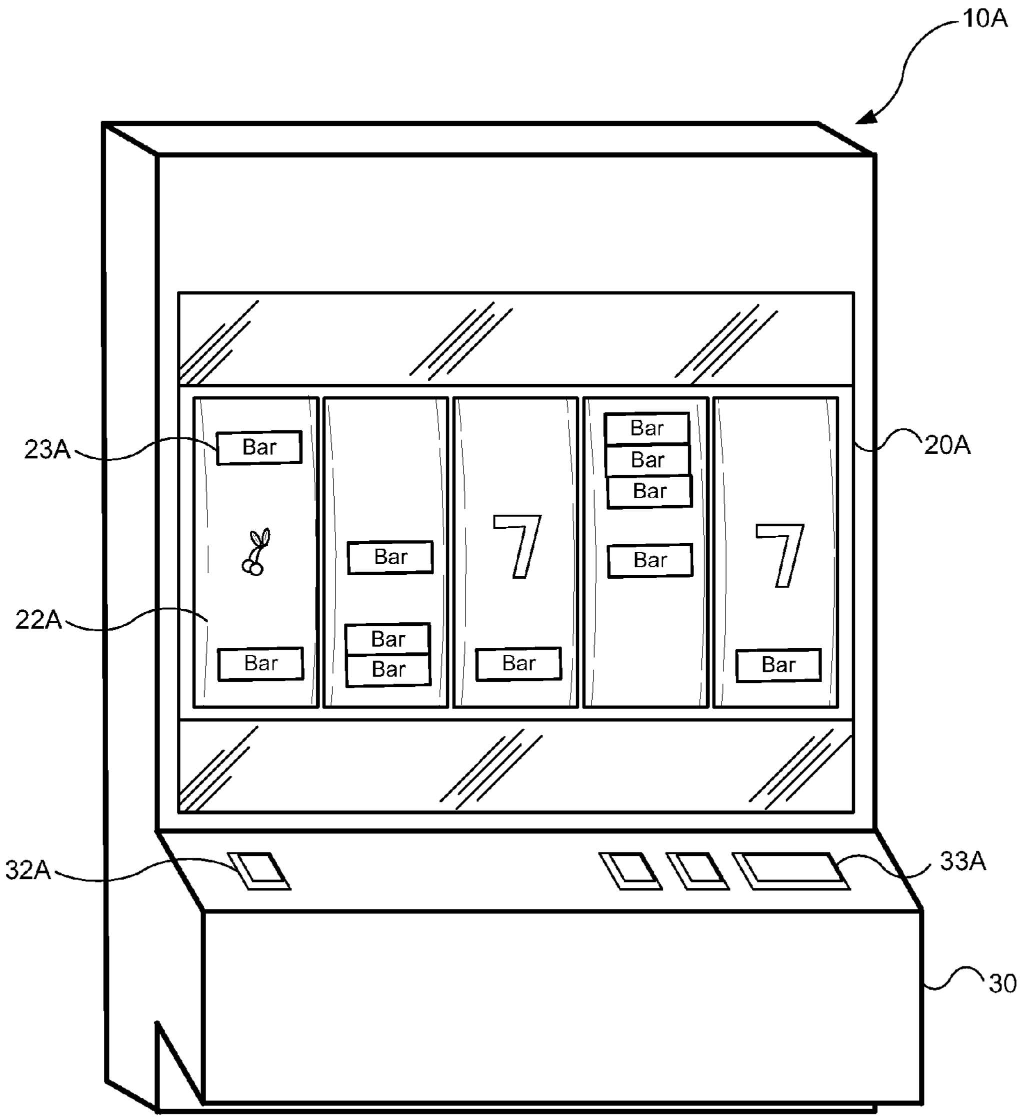
FIGS. 2A, 2B, and 2C are detail diagrams of exemplary types of gaming devices according to embodiments of the invention.
Figure 2B:
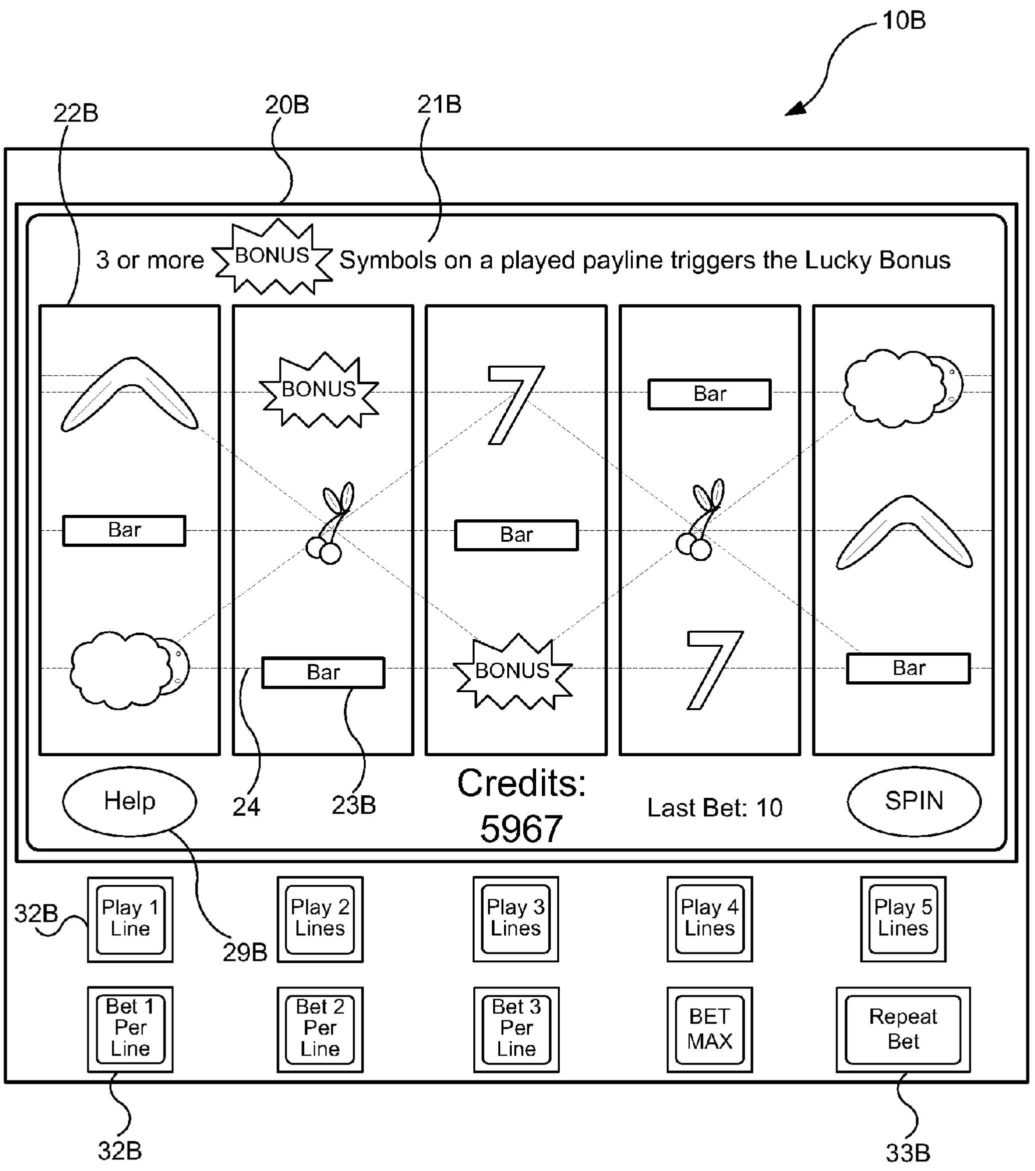
Figure 2C:
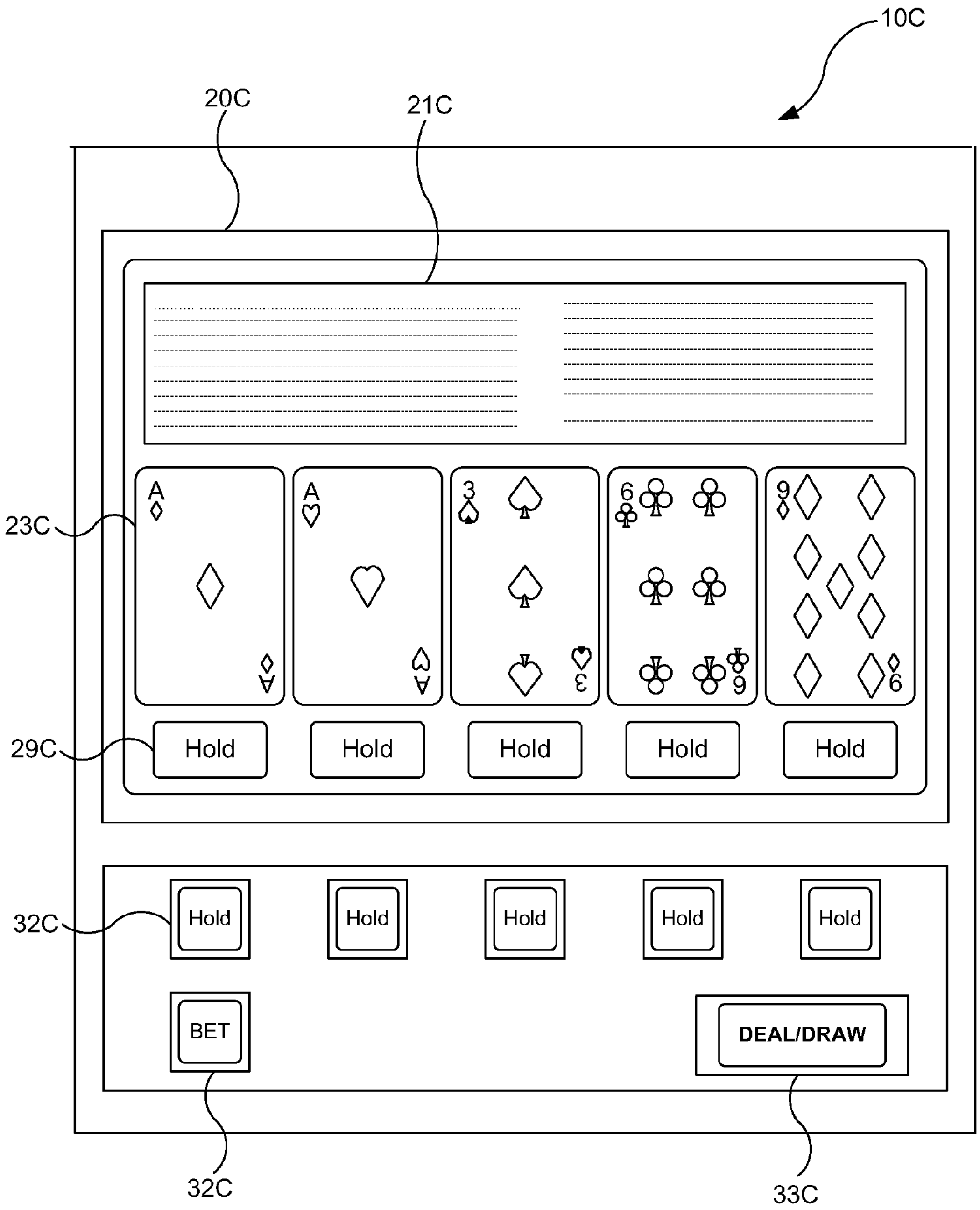

FIGS. 2A to 2C illustrate exemplary types of gaming devices according to embodiments of the invention. FIG. 2A illustrates an example spinning-reel gaming machine 10A, FIG. 2B illustrates an example video slot machine 10B, and FIG. 2C illustrates an example video poker machine 10C.

Referring to FIG. 2A, a spinning-reel gaming machine 10A includes a gaming display 20A having a plurality of mechanical spinning reels 22A. Typically, spinning-reel gaming machines 10A have three to five spinning reels 22A. Each of the spinning reels 22A has multiple symbols 23A that may be separated by blank areas on the spinning reels 22A, although the presence of blank areas typically depends on the number of reels 22A present in the gaming device 10A and the number of different symbols 23A that may appear on the spinning reels 22A. Each of the symbols 22A or blank areas makes up a "stop" on the spinning reel 22A where the reel 22A comes to rest after a spin. Although the spinning reels 22A of various games 10A may have various numbers of stops, many conventional spinning-reel gaming devices 10A have reels 22A with twenty two stops.

During game play, the spinning reels 22A may be controlled by stepper motors (not shown) under the direction of the microprocessor 40 (FIG. 1A). Thus, although the spinning-reel gaming device 10A has mechanical based spinning reels 22A, the movement of the reels themselves is electronically controlled to spin and stop. This electronic control is advantageous because it allows a virtual reel strip to be stored in the memory 41 of the gaming device 10A, where various "virtual stops" are mapped to each physical stop on the physical reel 22A. This mapping allows the gaming device 10A to establish greater awards and bonuses available to the player because of the increased number of possible combinations afforded by the virtual reel strips.

A game on a spinning reel slot machine 10A typically includes the player pressing the "bet-one" button (one of the game buttons 32A) to wager a desired number of credits followed by pulling the gaming handle 12 (FIGS. 1A, 1B) or pressing the spin button 33A to spin the reels 22A. Alternatively, the player may simply press the "max-bet" button (another one of the game buttons 32A) to both wager the maximum number of credits permitted and initiate the spinning of the reels 22A. The spinning reels 22A may all stop at the same time or may individually stop one after another (typically from left to right) to build player anticipation. Because the display 20A usually cannot be physically modified, some spinning reel slot machines 10A include an electronic display screen in the top box 18 (FIG. 1B), a mechanical bonus mechanism in the top box 18, or a secondary display 25 (FIG. 1A) to execute a bonus.

Referring to FIG. 2B, a video gaming machine 10B may include a video display 20B to display virtual spinning reels 22B and various other gaming information 21B. The video display 20B may be a CRT, LCD, plasma screen, or the like. It is usually preferable that the video display 20B be a touch-screen to accept player input. A number of symbols 23A appear on each of the virtual spinning reels 22B. Although FIG. 2B shows five virtual spinning reels 22B, the flexibility of the video display 20B allows for various reel 22B and game configurations. For example, some video slot games 10B spin reels for each individual symbol position (or stop) that appears on the video display 20B. That is, each symbol position on the screen is independent of every other position during the games. In these types of games, very large numbers of pay lines or multiple super scatter pays can be utilized since similar symbols could appear at every symbol position on the video display 20B. On the other hand, other video slot games 10B more closely resemble the mechanical spinning reel games where symbols that are vertically adjacent to each other are part of the same continuous virtual spinning reel 22B.

Because the virtual spinning reels 22B, by virtue of being computer implemented, can have almost any number of stops on a reel strip, it is much easier to have a greater variety of displayed outcomes as compared to spinning-reel slot machines 10A (FIG. 2A) that have a fixed number of physical stops on each spinning reel 22A.

With the possible increases in reel 22B numbers and configurations over the mechanical gaming device 10A, video gaming devices 10B often have multiple paylines 24 that may be played. By having more paylines 24 available to play, the player may be more likely to have a winning combination when the reels 22B stop and the game ends. However, since the player typically must wager at least a minimum number of credits to enable each payline 24 to be eligible for winning, the overall odds of winning are not much different, if at all, than if the player is wagering only on a single payline. For example, in a five line game, the player may bet one credit per payline 24 and be eligible for winning symbol combinations that appear on any of the five played paylines 24. This gives a total of five credits wagered and five possible winning paylines 24. If, on the other hand, the player only wagers one credit on one payline 24, but plays five games, the odds of winning would be identical as above: five credits wagered and five possible winning paylines 24.

Because the video display 20B can easily modify the image output by the video display 20B, bonuses, such as second screen bonuses are relatively easy to award on the video slot game 10B. That is, if a bonus is triggered during game play, the video display 20B may simply store the resulting screen shot in memory and display a bonus sequence on the video display 20B. After the bonus sequence is completed, the video display 20B may then retrieve the previous screen shot and information from memory, and re-display that image.

Also, as mentioned above, the video display 20B may allow various other game information 21B to be displayed. For example, as shown in FIG. 2B, banner information may be displayed above the spinning reels 22B to inform the player, perhaps, which symbol combination is needed to trigger a bonus. Also, instead of providing a separate credit meter 27 (FIG. 1A) and bet meter 28, the same information can instead be displayed on the video display 20B. In addition, "soft buttons" 29B such as a "spin" button or "help/see pays" button may be built using the touch screen video display 20B. Such customization and ease of changing the image shown on the display 20B adds to the flexibility of the game 10B.

Even with the improved flexibility afforded by the video display 20B, several physical buttons 32B and 33B are usually provided on video slot machines 10B. These buttons may include game buttons 32B that allow a player to choose the number of paylines 24 he or she would like to play and the number of credits wagered on each payline 24. In addition, a max bet button (one of the game buttons 32B) allows a player to place a maximum credit wager on the maximum number of available paylines 24 and initiate a game. A repeat bet or spin button 33B may also be used to initiate each game when the max bet button is not used.

Referring to FIG. 2C, a video poker gaming device 10C may include a video display 20C that is physically similar to the video display 20B shown in FIG. 2B. The video display 20C may show a poker hand of five cards 23C and various other player information 21C including a paytable for various winning hands, as well as a plurality of player selectable soft buttons 29C. The video display 20C may present a poker hand of five cards 23C and various other player information 21C including a number of player selectable soft (touch-screen) buttons 29C and a paytable for various winning hands. Although the embodiment illustrated in FIG. 3C shows only one hand of poker on the video display 20C, various other video poker machines 10C may show several poker hands (multi-hand poker). Typically, video poker machines 10C play "draw" poker in which a player is dealt a hand of five cards, has the opportunity to hold any combination of those five cards, and then draws new cards to replace the discarded ones. All pays are usually given for winning combinations resulting from the final hand, although some video poker games 10C may give bonus credits for certain combinations received on the first hand before the draw. In the example shown in FIG. 2C a player has been dealt two aces, a three, a six, and a nine. The video poker game 10C may provide a bonus or payout for the player having been dealt the pair of aces, even before the player decides what to discard in the draw. Since pairs, three of a kind, etc. are typically needed for wins, a player would likely hold the two aces that have been dealt and draw three cards to replace the three, six, and nine in the hope of receiving additional aces or other cards leading to a winning combination with a higher award amount. After the draw and revealing of the final hand, the video poker game 10C typically awards any credits won to the credit meter.

The player selectable soft buttons 29C appearing on the screen respectively correspond to each card on the video display 20C. These soft buttons 29C allow players to select specific cards on the video display 20C such that the card corresponding to the selected soft button is "held" before the draw. Typically, video poker machines 10C also include physical game buttons 32C that correspond to the cards in the hand and may be selected to hold a corresponding card. A deal/draw button 33C may also be included to initiate a game after credits have been wagered (with a bet button 32C, for example) and to draw any cards not held after the first hand is displayed.

Although examples of a spinning reel slot machine 10A, a video slot machine 10B, and a video poker machine 10C have been illustrated in FIGS. 2A-2C, gaming machines and various other types of gaming devices known in the art are contemplated and are within the scope of the invention.

Figure 3:
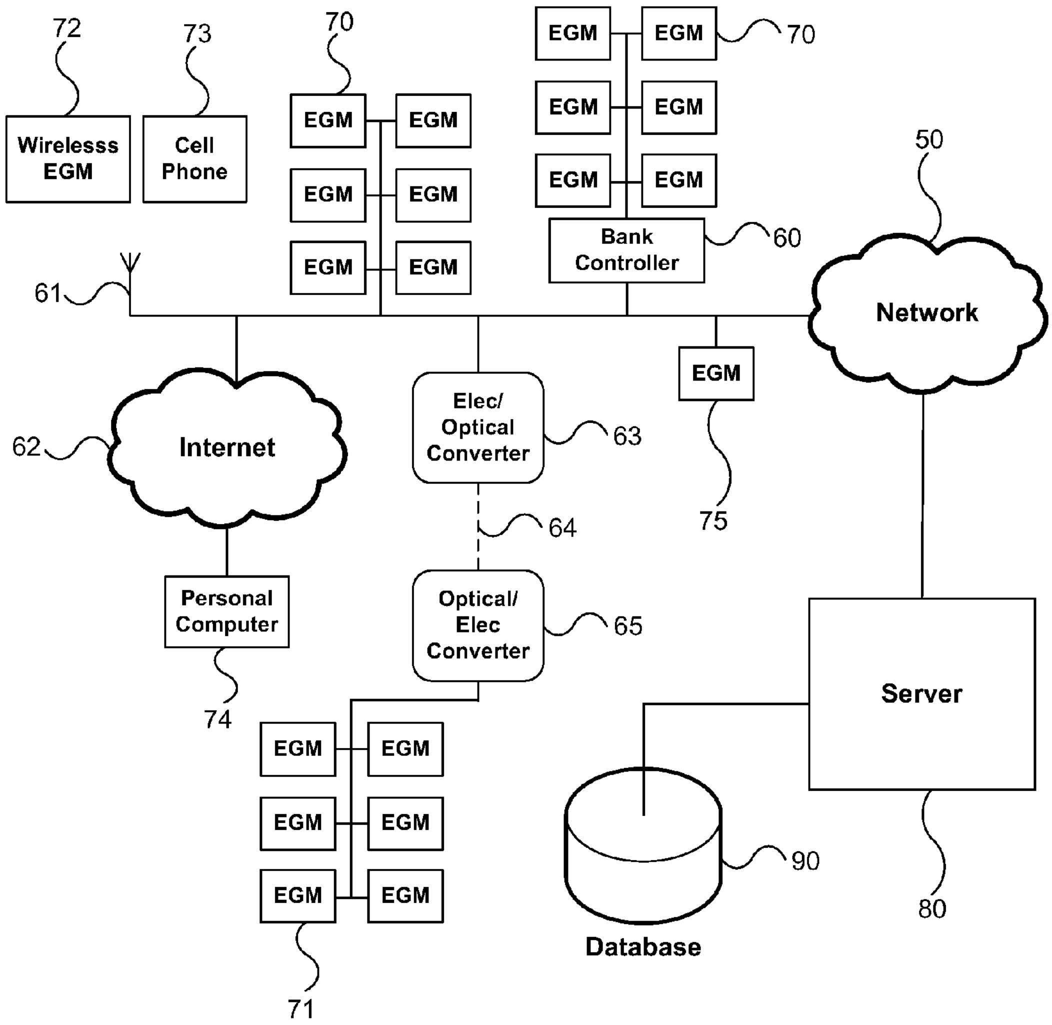
FIG. 3 is a functional block diagram of networked gaming devices according to embodiments of the invention.

FIG. 3 is a block diagram illustrating networked gaming devices according to embodiments of the invention. Referring to FIG. 3, multiple electronic gaming devices (EGMs) 70, 71, 72, 73, 74, and 75 may be coupled to one another and coupled to a remote server 80 through a network 50. For ease of understanding, gaming devices or EGMs 70, 71, 72, 73, 74, and 75 are generically referred to as EGMs 70-75. The term EGMs 70-75, however, may refer to any combination of one or more of EGMs 70, 71, 72, 73, 74, and 75. Additionally, the gaming server 80 may be coupled to one or more gaming databases 90. These gaming network 50 connections may allow multiple gaming devices 70-75 to remain in communication with one another during particular gaming modes such as tournament play or remote head-to-head play. Although some of the gaming devices 70-75 coupled on the gaming network 50 may resemble the gaming devices 10, 10A, 10B, and 10C shown in FIGS. 1A-1B and 2A-2C, other coupled gaming devices 70-75 may include differently configured gaming devices. For example, the gaming devices 70-75 may include traditional slot machines 75 directly coupled to the network 50, banks of gaming devices 70 coupled to the network 50, banks of gaming devices 70 coupled to the network through a bank controller 60, wireless handheld gaming machines 72 and cell phones 73 coupled to the gaming network 50 through one or more wireless routers or antennas 61, personal computers 74 coupled to the network 50 through the internet 62, and banks of gaming devices 71 coupled to the network through one or more optical connection lines 64. Additionally, some of the traditional gaming devices 70, 71, and 75 may include electronic gaming tables, multi-station gaming devices, or electronic components operating in conjunction with non-gaming components, such as automatic card readers, chip readers, and chip counters, for example.

Gaming devices 71 coupled over an optical line 64 may be remote gaming devices in a different location or casino. The optical line 64 may be coupled to the gaming network 50 through an electronic to optical signal converter 63 and may be coupled to the gaming devices 71 through an optical to electronic signal converter 65. The banks of gaming devices 70 coupled to the network 50 may be coupled through a bank controller 60 for compatibility purposes, for local organization and control, or for signal buffering purposes. The network 50 may include serial or parallel signal transmission lines and carry data in accordance with data transfer protocols such as Ethernet transmission lines, Rs-232 lines, firewire lines, USB lines, or other communication protocols. Although not shown in FIG. 3, substantially the entire network 50 may be made of fiber optic lines or may be a wireless network utilizing a wireless protocol such as IEEE 802.11 a, b, g, or n, Zigbee, RF protocols, optical transmission, near-field transmission, or the like.

As mentioned above, each gaming device 70-75 may have an individual processor 40 (FIG. 1A) and memory 41 to run and control game play on the gaming device 70-75, or some of the gaming devices 70-75 may be terminals that are run by a remote server 80 in a server based gaming environment. Server based gaming environments may be advantageous to casinos by allowing fast downloading of particular game types or themes based on casino preference or player selection. Additionally, tournament based games, linked games, and certain game types, such as BINGO or keno may benefit from at least some server 80 based control.

Thus, in some embodiments, the network 50, server 80, and database 90 may be dedicated to communications regarding specific game or tournament play. In other embodiments, however, the network 50, server 80, and database 90 may be part of a player tracking network. For player tracking capabilities, when a player inserts a player tracking card in the card reader 46 (FIG. 1A), the player tracking unit 45 sends player identification information obtained on the card reader 46 through the MCI 42 over the network 50 to the player tracking server 80, where the player identification information is compared to player information records in the player database 90 to provide the player with information regarding their player account or other features at the gaming device 10 where the player is wagering. Additionally, multiple databases 90 and/or servers 80 may be present and coupled to one or more networks 50 to provide a variety of gaming services, such as both game/tournament data and player tracking data.

The various systems described with reference to FIGS. 1-3 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

Embodiments of the present concept provide gaming devices configured for linked game play. First and second gaming devices that are separately playable by first and second players are electronically linked so that a gaming event being played at the first gaming device may also be being played at the second gaming device. Also provided is a method of sharing game play across multiple gaming devices, where the method includes receiving a wager from a first player at a first gaming device, receiving a wager from a second player at a second gaming device, initiating a gaming event that is displayed at the first and second gaming devices, and awarding prizes associated with gaming outcomes displayed at the first and second gaming devices. These and other arrangements of the present concept may allow cooperative or competitive game play between the first and second player. These and other embodiments of the present concept provide an electronic gaming device that enables a shared gaming experience The separate gaming devices may be implemented to permit each player to play separate games while still being linked so that each player can participate in shared bonuses. Alternatively, the gaming devices may be linked so that each player is playing a shared game. In these embodiments, one of the gaming devices may be designated as the primary gaming device that is responsible for operating gaming code to present game outcomes to the shared game. Alternatively, a remote server or bank controller may operate game code that results in the displayed shared game on each of the gaming devices.

In embodiments where the players are playing separate games on the gaming devices, the players may have individual credit meters that are neither linked nor visible to other players that are linked to the gaming devices. However, in other embodiments, the players may share a common credit meter by which each player can fund their wagers on the separate gaming devices. In these embodiments, the wager for each player could be identical or different from one another. Any winnings, e.g., from jackpots or bonuses, could go to a single winning pool, such as the credit meter that funds the bets. Alternatively, each player could have a jackpot meter upon which wins from the respective games are stored.

Figure 4:
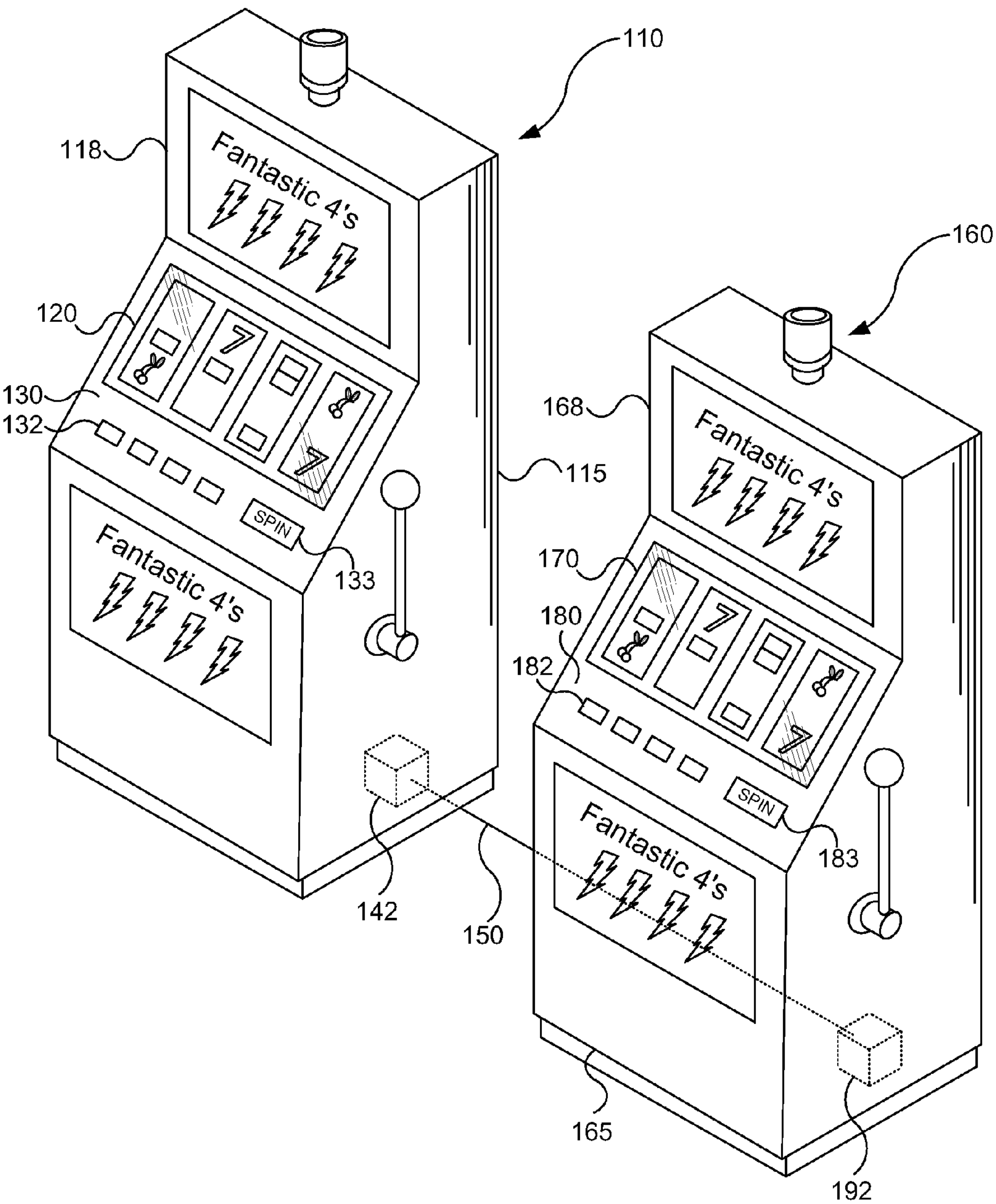
FIG. 4 is an isometric view of gaming devices according to embodiments of the invention.

FIG. 4 is an isometric view of gaming devices according to embodiments of the invention.

Referring to FIG. 4, a first gaming device 110 may include a gaming cabinet 115 having a display 120 and a player interface panel 130 that are both configured to allow a player to play a game on the gaming device 110. A second gaming device 160 may include a gaming cabinet 165 having a display 170 and a player interface panel 180 that are both configured to allow a player to play a game on the gaming device 160. The first gaming device 110 may include a first connection port 142 and the second gaming device 160 may include a second connection port 192 that is connected to the first connection port 142 through a signal connector 150. That is, the first gaming device 110 may be connected or linked to the second gaming device 160 through the signal connector 150. The signal connector 150 may be a dedicated cable connecting serial ports (first and second connection ports 142, 192), may be part of a gaming network 50 (FIG. 3), or may be any other type of connection channel capable of allowing the first gaming device 110 to communicate with the second gaming device 160. Further, although only two gaming devices are shown in FIG. 4, additional gaming devices may be present and connected to the first and/or second gaming devices 110, 160 in other embodiments.

Figure 6:
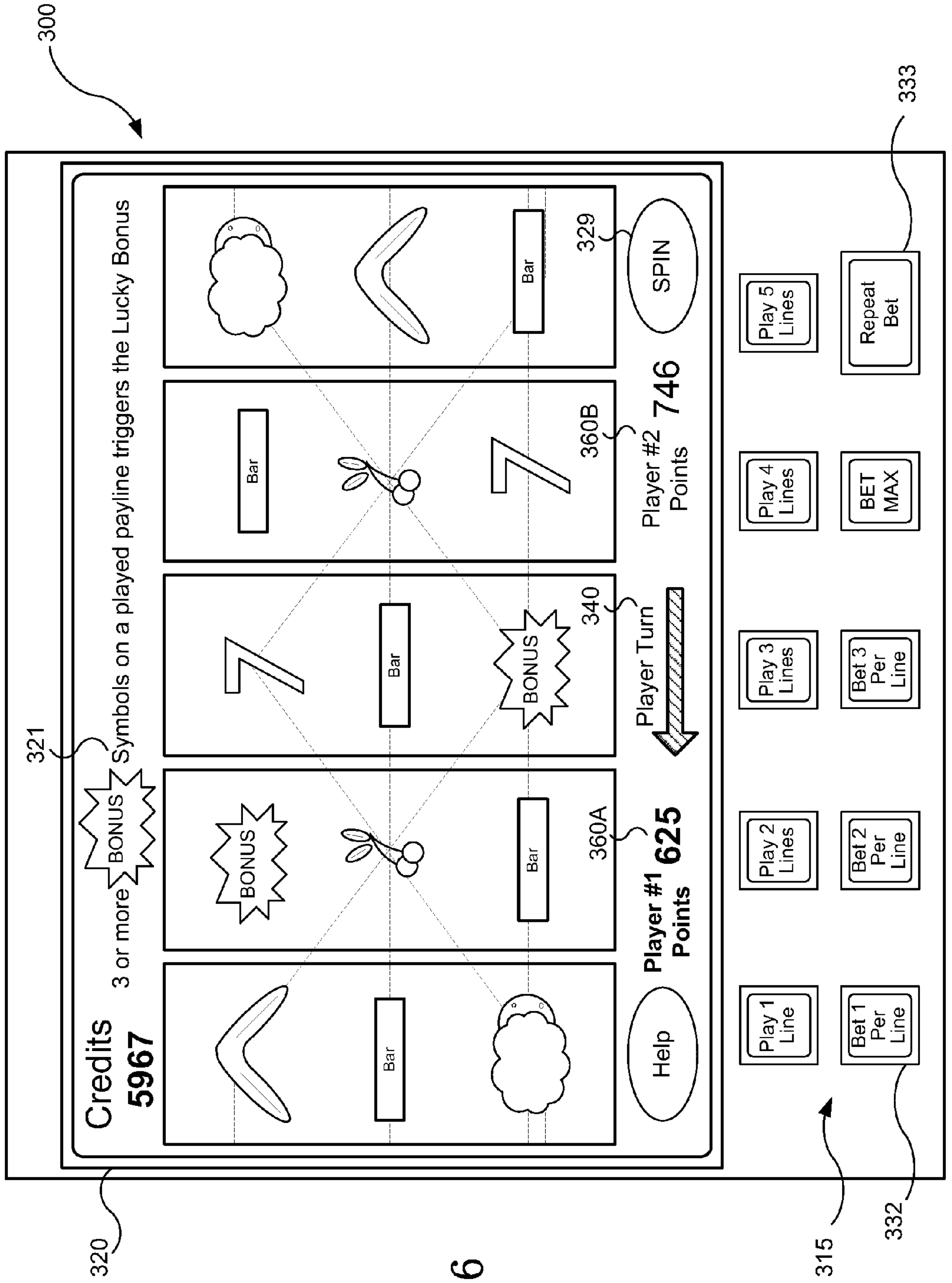
FIGS. 6 and 7 are detail diagrams of exemplary types of gaming devices according to embodiments of the invention.
Figure 7:
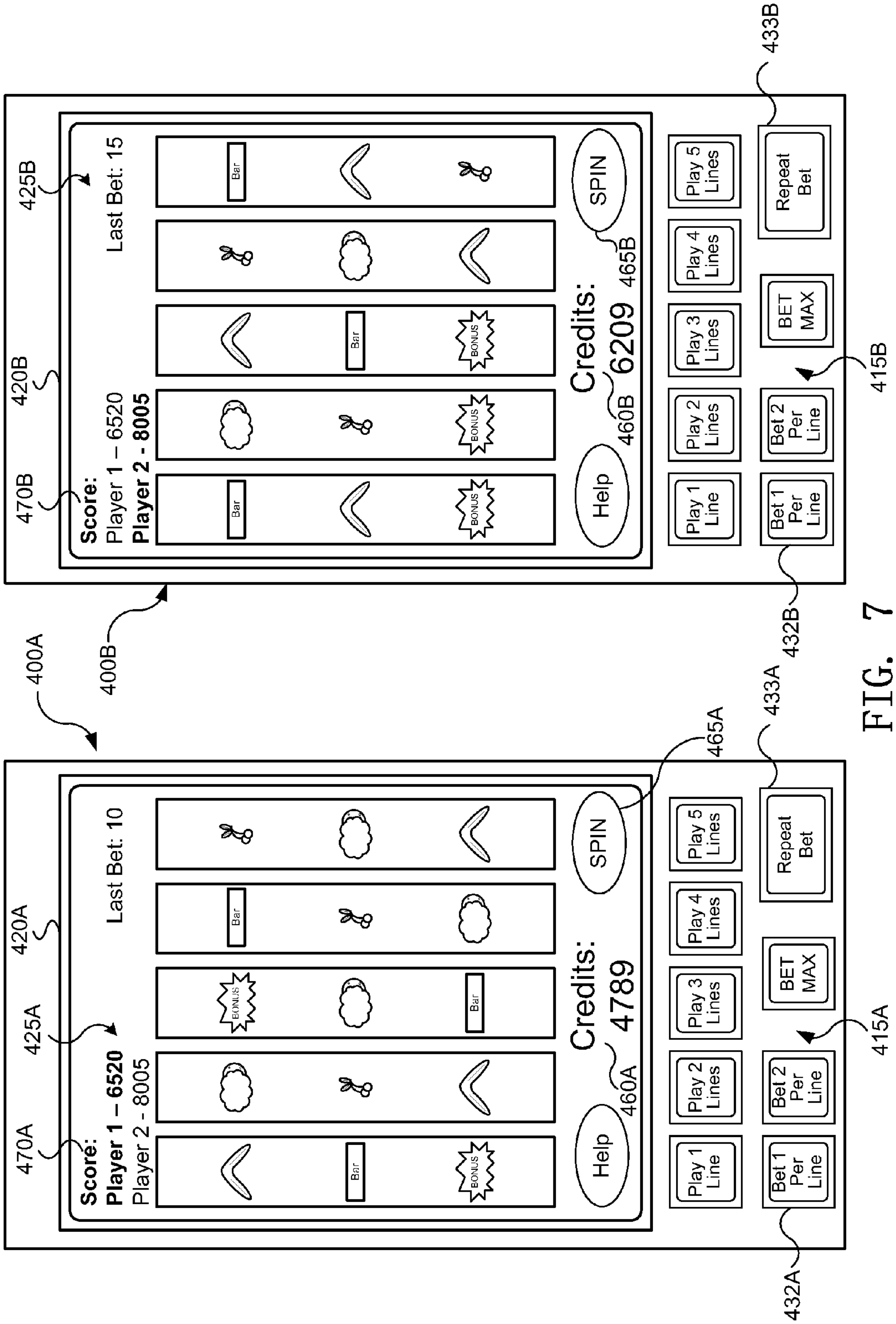

The gaming displays 120, 170 may show a common game to both gaming devices 110, 160 (FIG. 6) or show separate games being played on reach respective gaming device (FIG. 7). The player interface panels 130, 180 may include respective game buttons 132, 182 and game initiation buttons 133, 183. The gaming devices may both include player tracking units (45 in FIG. 1) with card readers (46 in FIG. 1) that keep player tracking data after each player has inserted and removed his or her player card. The players may be able to use the one or more buttons (47 in FIG. 1) associated with the player tracking unit 45 to assign a particular player tracking card to particular elements of game play on each game station. For example, as described below, in some embodiments players may be able to participate in shared bonus events that are triggered from one of the gaming devices. The allocation of player points for participation in the shared bonus may be assigned to the triggering player or may be allocated between the participating players based on assigned values set when the player tracking cards are used to identify the players. In another example, a husband and wife may be playing a linked gaming session, but only the wife is a member of the casino loyalty program. Both of the player's game play at the different gaming devices could be credited to the wife's player account if properly assigned at the beginning of linked game play. This may ensure that each player gets credit for their wagering activities, or that all wagering activity is credited to a player account. Alternatively, the gaming devices 110 and 160 may only recognize a single player account during game play associated with the current player. Here, each player would be credited for their associated game play.

Embodiments of this concept are directed to all types of linking gaming devices. These embodiments may range from linking games of completely independent gaming devices and players to participate in a shared bonus, to gaming devices that can be linked so that the same game is displayed on both gaming devices. The first type of embodiments may be implemented on banks of similar gaming devices or on similar gaming devices across a gaming floor or across related gaming properties where players do not have to know or interact with each other, but may still have the chance to join in a linked bonus. The other types of embodiments may be preferable for players that are friends or family members and want to share a gaming experience together. Each of these types of embodiments will be discussed generally below and in more detail with reference to the figures and description below.

Linked games that are substantially independent may still be linked to allow players to participate in group, cooperative, competitive, or shared bonuses or other game events. In these embodiments, most of the base game play of these gaming devices may be similar to conventional gaming devices. However, these devices may be linked to provide the players with a more interactive bonus format. The participation in the linked bonuses may be built into the paytables of the games, e.g., the more players eligible to link together, the less often a trigger condition is presented so that the number of eligible players does not affect the frequency or amounts of the bonus. Here, each time a bonus is triggered by any of the players, all the players automatically participate in the linked bonus and share in the winnings depending upon their actions in the bonus. In other embodiments, only a player who triggers the bonus may play the bonus for no additional cost. Each of the other players may be presented with an invitation to participate in the bonus, but may have to "buy" an entry into the bonus. Here, the players may "buy" into the shared bonus when offered for a rate substantially equal to the average payout of the bonus so that the player has an incentive to play in the shared bonus. For example, a player may be invited to play in a shared bonus for a cost of 100 credits. If the player accepts the invitation, 100 credits is deducted from her credit meter and the player enters the bonus with the player who triggered the bonus. The average payout of the bonus may be 100 credits; however, each player may win much more or less than the 100 credits. In this example, suppose the triggering player wins 175 credits while the player that bought in only wins 50 credits. Here, the player "buying" in the bonus actually loses 50 credits in the bonus. However, since the average payout is substantially equal to the cost of the bonus, the player over time is more likely to have a higher payback than by only playing the base game. In addition, the player may always decline to participate in the bonus, and may even choose an option to not receive invitations for shared bonus, an opt out option. Some of these embodiments are discussed below in additional detail with reference to FIG. 11. The links between these gaming devices may be controlled through a triggering gaming device that invites other predefined gaming devices to join in, controlled through a bank controller 60 (FIG. 3), or controlled by a remote server 80.

Linked games that are closely related may allow players to share play of the same game, of related games, or of different games that have linked features and game events. These embodiments are discussed in greater detail below with reference to FIGS. 6 and 7. Having closely linked game play may allow players to participate in cooperative and/or competitive game play while sharing the experience at the same time. The links between these types of gaming devices may be established by the game configuration, such as in a pair of games or a group/bank of games that advertise the linked feature. However, in other embodiments players may link to each other on any two gaming devices, even gaming devices across the game floor or even in separate casinos. Alternatively, linked gaming devices could include not only games within a casino but games played on mobile phones, Personal Data Assistances, home computers, netbook computers, laptop computers and other such devices. Within these combinations, it is possible that the linked gaming devices may be of different types. For example, a slot machine in a casino in Las Vegas may be linked to a laptop computer in New Jersey over the Internet.

Depending on the types of gaming devices being linked, there are various manners to establish this link. In some embodiments, players may connect or link through player accounts if they are identified players. In other embodiments, the players may obtain link tokens from a player service desk or kiosk. When each player associates their related link tokens (e.g., a ticket) with the gaming devices they choose, the gaming devices may each contact a remote servers 80 to find and link to each other. Once linked, the players may choose between link options to establish how they would like to configure the linked game play. Alternatively, casinos may structure what options are available in link game play and distribute different link tokens to establish different types of game links, such as whether or not the gaming devices will share a common credit meter. The options for these link tokens may be set at the player kiosk or gaming desk to include the options desired by the players. Also, more than two link tokens may be distributed to allow groups of three, four, or more players to establish linked games. To link gaming devices where at least one of the devices is not located on a gaming floor, the players may use the Internet or another network to identify another gaming device with which a link is desired to be established. Here, the players may use a search function to identify the other gaming device, or may enter a unique identification code provided by another player to identify the other gaming device. Once all of the gaming devices to be linked are identified, the network may be used to establish the communication link between the gaming devices.

The configuration of the linked gaming devices 110 and 160 allows players to play independently on separate gaming devices while allowing players to play in a more interactive manner through shared displays, common credit meters, shared bonuses, etc. Some of the various features of these configurations are described in further detail below.

Figure 5A:
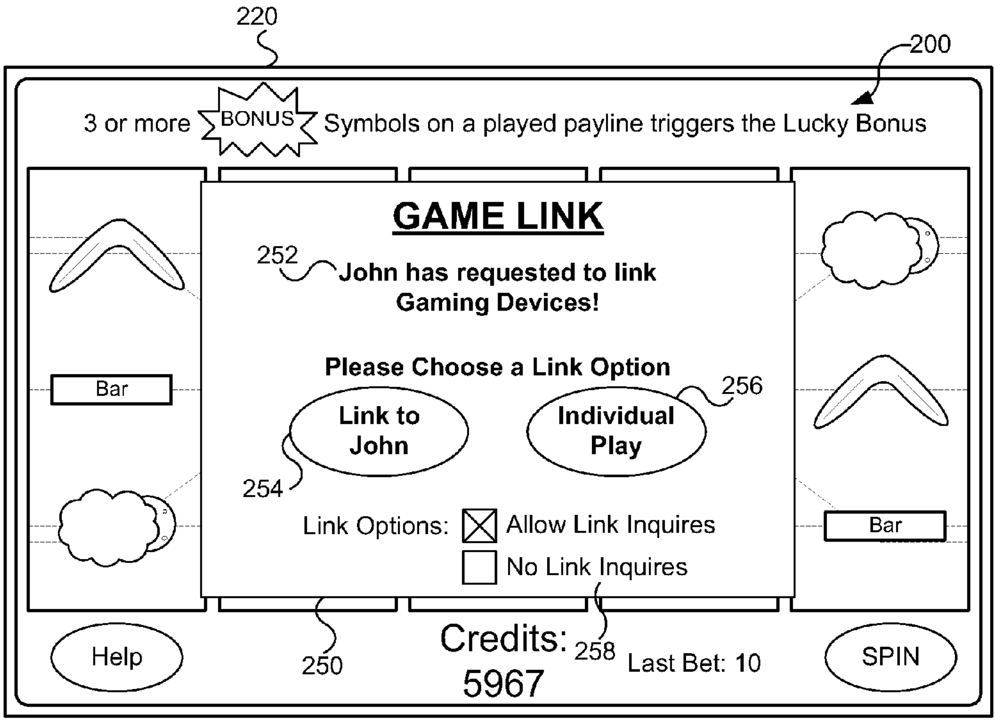
FIGS. 5A and 5B are detail diagrams of displays of gaming devices according to embodiments of the invention.
Figure 5B:
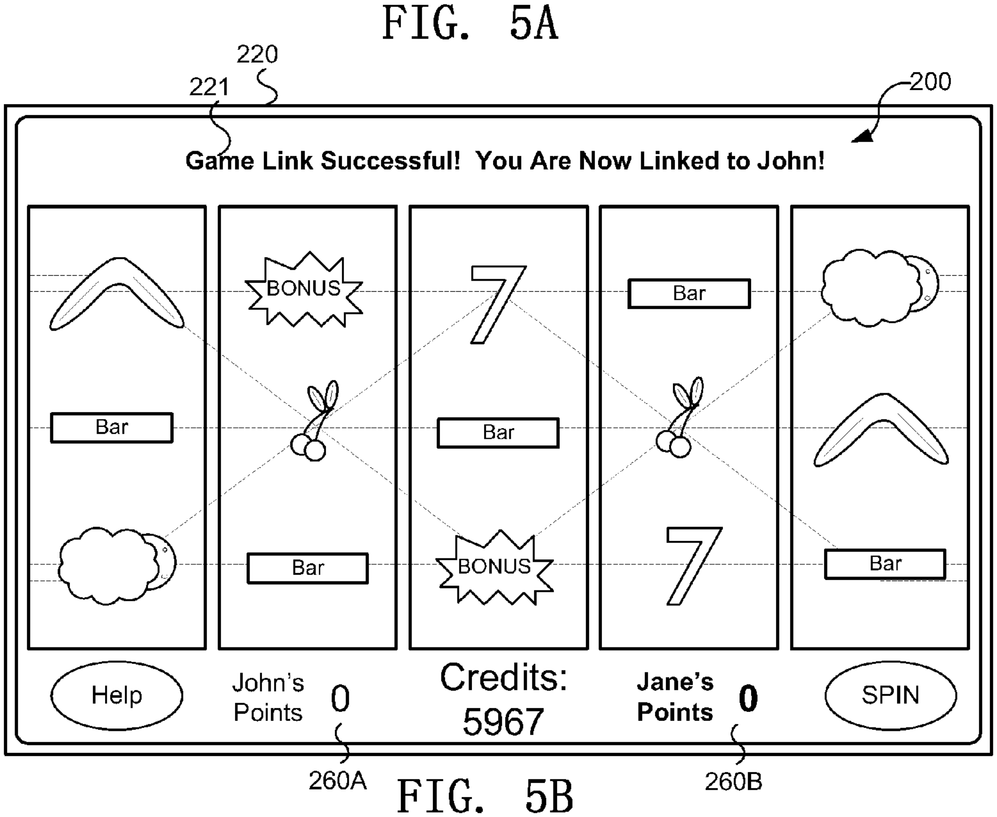

FIGS. 5A and 5B are detail diagrams of displays of gaming devices according to embodiments of the invention. In particular, FIG. 5A shows an exemplary linking invitation and FIG. 5B shows the change in the gaming device display when the linking invitation is accepted. However, while these illustrate figures show some embodiments of how players may link gaming devices, many other embodiments are possible for different linking configurations as discussed above.

Referring to FIG. 5A, a gaming device 200 has a game display 220 that displays game information to a player. Here, after the completion of a current game, a link invitation window 250 appears on the game display 220 inviting the current player (Jane) to link gaming devices with John. A link message 252 explains that John has requested to link gaming devices. Jane may choose to link to John's gaming device by pressing the Link Accept Button 254 or choose to decline the line invitation by pressing the Link Decline or Individual Game Play button 256. In addition, the link invitation window 250 includes a link preference option 258 to allow Jane to control future game link invitations. That is, Jane may select to prevent any link inquires or invitations by selecting the link preference option box 258 next to "No Link Inquires." Additionally, a player may choose to prevent any link inquires by using a "Help" soft button 329 (FIG. 6) or "Manage Links" soft button (not shown). The player may also set a preference of receiving link invitations in a player preference section of the player's loyalty account.

The nature of the link between the gaming devices may be determined by the casino's setting, the style of game devices, from stored player preferences, or may be selected after a link is established from a "Manage Link" menu in the help screens. The link message 252 in the link invitation window 250 may further specify the type of link being requested. In other embodiments, certain gaming devices may be automatically linked to each other. For example, pairs of games that are advertised as having linked game play may not require an invitation to establish a link between the gaming devices. Rather the link may be part of the game experience on the gaming devices. In other embodiments, a bank of games may be configured to have completely separate base games, but be linked to one another for shared bonuses between the gaming devices as described above.

Referring to FIG. 5B, Jane has accepted the link invitation from John. A game information banner 221 confirms that the game link is successful. In addition, player score meters 260A and 260B are implemented on the game display 220. As the link has just been established, the player's score meters are set at zero. However, if these two players have a history of competition that is stored in one or both of their player accounts, a saved score value may be implemented on the score meters 260A and 260B when the gaming devices are linked.

FIGS. 6 and 7 are detail diagrams of exemplary types of gaming devices according to embodiments of the invention. FIG. 6 illustrates a common display used for shared game play on multiple gaming devices. FIG. 7 illustrates multiple gaming devices 400A and 400B with separate game displays.

Referring to FIG. 6, each gaming device 300 includes a player interface panel 315 and a display 320 showing a common game screen. The common game screen appears substantially identically on each of the game displays 320, and may be referred to herein as the common game display or common display. In the embodiment shown in FIG. 6, the common display 320 is a video display. However, in a spinning reel slot machine (e.g., FIG. 2A) the common display 320 may include a plurality of spinning reels. The common display 320 may display a single base game, such as a video slot game or a video poker game. In addition, the common display 320 may show player information 321 common to both players, such as a banner or a common credit meter. The common display 320 may also include common soft buttons 329 to interact with the gaming device. By referring to an element as "common" in this application, it is meant that it is similarly shown on the displays of both gaming devices and manipulated substantially simultaneously.

In some embodiments each of the common displays 320 may include respective player specific information that is not shared with the other display 320, such as separate unrelated credit meter data, player account point information, etc. Additionally, each display 320 may emphasize specific player information. For example, each display 320 may show player 1 game points 360A and player 2 game points so that each player can compete against each other. However, the player at a particular gaming device 300 may have their associated player score highlighted or otherwise differentiated from the other player's score. In the embodiment illustrated in FIG. 6, the gaming device 300 shown may be associated with player 1 since player 1's point meter 360A is highlighted.

In operation, the gaming devices 300 may allow a first player at the first gaming device and a player at the second gaming station to alternately play the shared base game that appears on the common display 320. For example, player 1 may start the wagering by choosing to play five lines at one credit per line and pushing the game initiating button 333 at the first gaming device. The credits bet by player 1 (in this case, five) may be deducted from a common credit meter (part of the player information 321) or from an individual credit meter (FIG. 6) associated with the first gaming device. If the wager made by player 1 results in a win, either the common credit meter 221 or player 1's individual credit meter is incremented by the amount of the award associated with the winning outcome.

In addition, events that happen during player 1's wager may accumulate points on the player 1 point meter 360A. Similarly, events that occur during player 2's wager may accumulate points on the player 2 point meter 360B. This way, if a common credit meter is used, the players still have an opportunity to compare the relative success each has had against the other. The scores shown on the player 1 point meter 360A and the player 2 point meter 360B may be based on a comparison of the respective player's payback versus the theoretical payback percentage of the gaming devices 300. In addition, a normalized scoring scheme may be used to normalize the scores shown on the player 1 point meter 360A and the player 2 point meter 360B so that scores based on the relative wagering success of each player can be compared irrespective of amounts wagered, the respective wagering rates, etc. For example, one normalizing scoring scheme may include dividing an amount awarded by an amount wagered in generating a player score.

After player 1 has completed a game or a gaming session, a player indicator 340 may change to indicate that it is player 2's turn to wager. In addition to having the player indicator 340 indicate which player is allowed to wager, the game buttons 332 and game initiating button 333 of the gaming device that is activated for game play\may become illuminated and activated while the game buttons 332 and game initiating button 333 corresponding to the other gaming device may have any back lighting turned off and become inactive. That is, even if player 1 attempts to wager during player 2's turn, he or she will be unable to place a wager using the buttons associated with the first game device. After player 2 has placed a wager and completed a gaming session, the player indicator 340 may again indicate that it is player 1's turn and the button illumination and activation procedure may be reversed.

Although the above operational example indicates that player 1 and player 2 switch wagering turns after each game, multiple games by each player may be implemented with each player's turn. In addition, the number of games per turn may be varied by casino personnel, by the players themselves, or set through a player preference setting associated with the player tracking information. Further, the number of games per turn may not necessarily be equal. For example, the gaming devices 300 may be set so that player 1 receives three wagering opportunities per turn while player 2 receives only one opportunity. This may allow players to contribute different amounts of money to a common credit meter and wager a corresponding percentage of the time. In the above example (where player 1 gets three turns to every one for player 2), player 1 may have contributed $75.00 to the common credit meter while player 2 contributed $25.00.

Further, although FIG. 6 shows that the player point meters 360A, 360B, credit meter 321 and player indicator 340 are displayed on the display 320 shown on both gaming devices, separate credit meters (such as 27 and 28 in FIG. 1) and/or a mechanical indicator (not shown) may be implemented in other embodiments.

Bonuses awarded during a gaming session may be played by the player who triggered the bonus or had the turn when the bonus was awarded. For example, if player 1 triggered a second screen bonus during a gaming session, player 1 would get to play the bonus or at least get any award from the bonus credited to his or her player point meter 360A or individual credit meter. In other embodiments, however, a bonus triggered by one player may provide a bonus that is interactive for both players. That is, a bonus may be triggered that requires interaction by both players. This dual-player interactive bonus or shared bonus may be preferable because it keeps both players involved in the gaming experience. These dual-player interactive bonuses may include bonuses where both players are competing for prizes, bonuses where both players are cooperating to achieve a common bonus goal, or bonuses where the non-triggering player can place a side bet on whether the triggering player reaches a certain bonus threshold. In some embodiments, a non-triggering player may be able to participate in an interactive bonus, but the credits earned by the non-triggering player will be added to the triggering player's credit meter. That is, the interactive bonus may allow both players to be involved in a bonus while only providing credits to a triggering one of the players. In other embodiments, an interactive bonus may be configured so that when one player triggers the bonus, the other player plays the bonus. The credits awarded in the bonus may still be credited to the triggering player's credit meter. The interactive bonus procedure is described in additional detail below with reference to FIG. 9 and exemplary dual-player interactive bonuses are described below with reference to FIGS. 10A and 10B.

As mentioned above, it may be advantageous to have player score meters 360A and 360B to keep track of the players wagering results. The scoring may be based primarily on the total wins for each player. Other scoring, besides total win, could be kept, however. Such scoring could be win based, but not based on total win, or could be based on activity other than wins. For example, some scoring/award could be offered if both players achieve specific outcomes back to back. In another version players could work in tandem to accomplish a specific goal, such as completing a bonus game. In another version, scoring could be determined by how much each player won as a percentage of total wagers made. For example, if Mary wins $130 on $170 of wagers, her score is 130/170*100=76. Ted wins $150 on $210 wagered but has a score of 150/210*100=71, therefore Mary wins even though Ted won more in jackpots. These scoring procedures may instill a sense of competition between friendly players.

Referring to FIG. 7, a first gaming device 400A includes a first display 420A and a second gaming device 400B includes a second display 420B. The first display 420A and the second display 420B may each show respective base games 425A and 425B of the first and second gaming devices 400A and 400B. However, the displays 420A and 420B may be configured to show a common bonus or other game aspect during linked game play. That is, even if the base games of gaming devices 400A and 400B are completely separate, the linked nature of the game devices may allow players to still participate in common game events. The first gaming device 400A may include a player interface panel 415A that includes game buttons 432A and a game initiation button 433A specifically configured to the theme of the first gaming device 400A.

Likewise, the second gaming device 400B may include a player interface panel 415B that includes game buttons 432B and a game initiation button 433B specifically configured to the theme of the second gaming device 400B. As discussed above, gaming devices may be linked even if they do not share a common theme or style. Hence, the game buttons 432A on the first gaming device 400A may not be similar to the game buttons 432B on the second gaming device 400B.

Each gaming device 400A, 400B may have a separate credit meter 460A, 460B. These credit meters may be entirely controlled by the respective players on each of the gaming devices 400A and 400B. That is, credits input on the first gaming device 400A are only available to wager on the first gaming device and any credits won on the first gaming device are incremented on the first credit meter 460A. In other embodiments where credits are being shared, having separate credit meters 460A, 460B may allow players who play at different speeds or use different wagering amounts to use equal shares of any inputted credits. For example, if 5000 credits were input into the gaming devices 400A and 400B and split evenly between the two players, each player would have 2500 credits to wager. This may prevent a situation on a common credit meter where a player playing max bet uses a larger percentage of the credits on the common credit meter than another player who is playing less than max bet. Additional details about splitting credits input into the gaming devices 400A and 400B are discussed below with reference to FIGS. 8A-8C.

Each of the displays of the gaming devices 400A and 400B may also include respective soft buttons 465A and 465B to help facilitate game play of the respective base games 425A and 425B. In addition, the first gaming device may include a first score display 470A that displays the player score of each player, but highlights the score of the first player playing the first gaming device 400A. Similarly, the second gaming device may include a second score display 470B that displays the player score of each player, but highlights the score of the second player playing the second gaming device 400B.

Figure 12A:
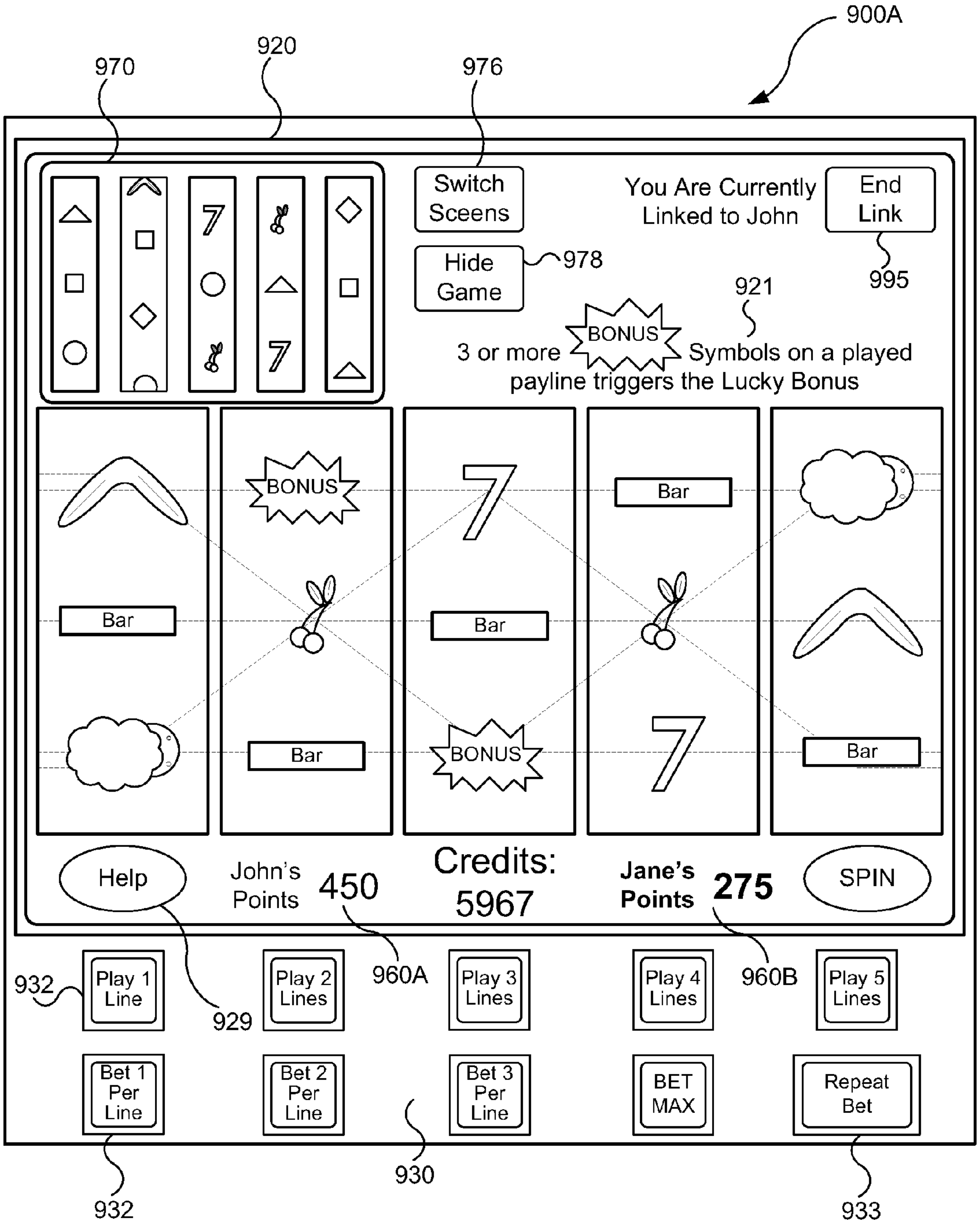
FIGS. 12A and 12B are detail diagrams of a gaming device according to embodiments of the invention.
Figure 12B:
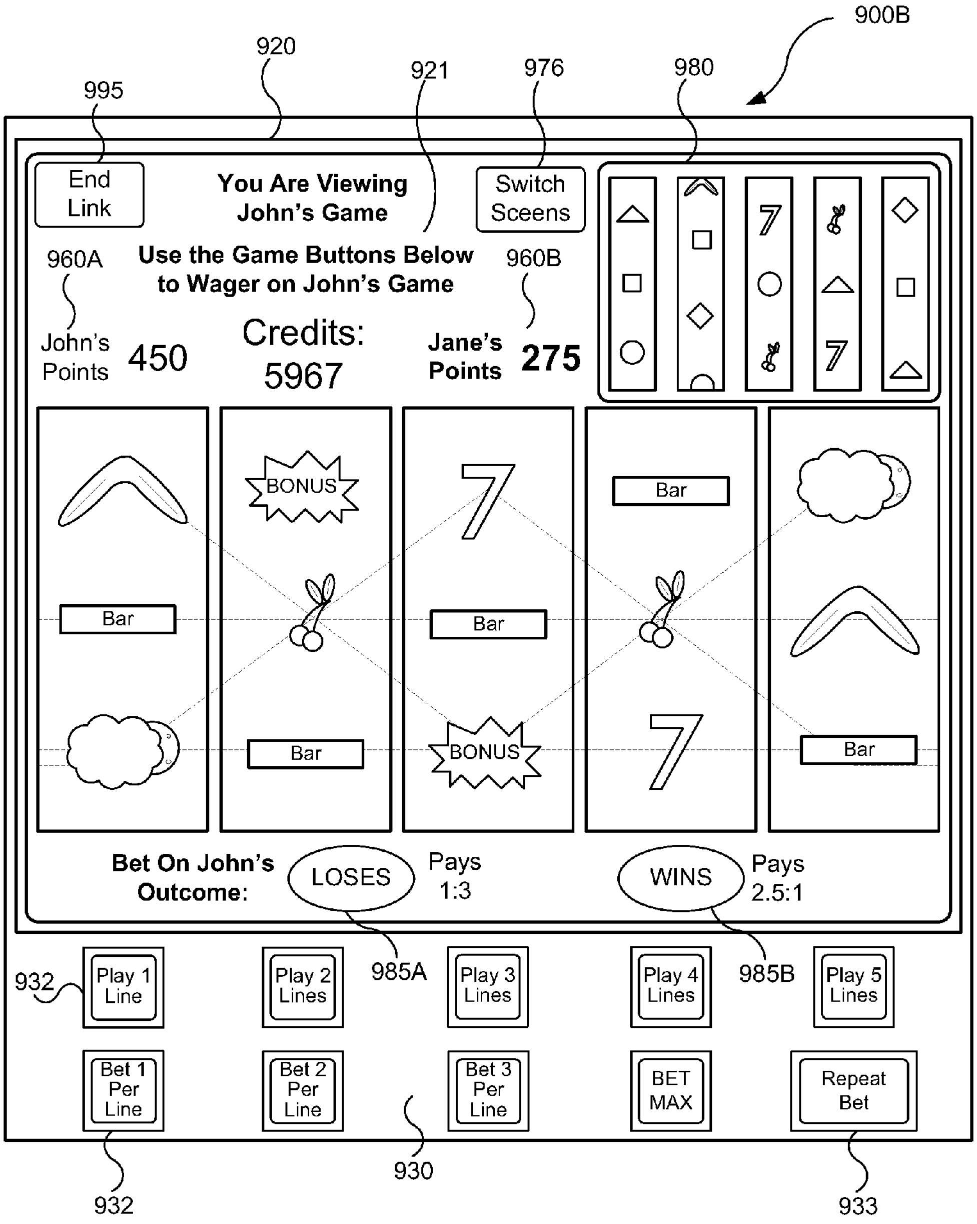

In operation, the each gaming device 400A and 400B allows each player to wager on separate base games. In some embodiments, the base games may be similar in theme. In other embodiments, however, each player may have the opportunity to select a gaming device theme or style that they would like to play. For example, a player at the first gaming device 400A may choose to play a video slot machine with a tropical theme while another player on the second gaming device 400B may choose to play a video keno game. If the players are playing a similar type of game, the gaming devices 400A and 400B may be configured to carry out the gaming sessions substantially simultaneously after each player has placed a wager during linked game play. This configuration may be preferable to heighten competition between players since the outcome of each gaming session can be immediately and directly compared between the players. This may be especially useful if both gaming sessions are being displayed on each gaming device as shown in FIGS. 12A and 12B. Alternatively, the gaming devices 400A and 400B may be configured to allow each player to play at a rate that is comfortable to them. In other words, each gaming session on the gaming devices 400A and 400B may be substantially or completely independent of each other.

Some embodiments may take advantage of having gaming sessions configured to occur substantially simultaneously by allowing each of the multiple players to place multiple bets on the outcomes of the gaming sessions. For example, a first player at the first gaming device 400A may be able to place a wager on the game outcome of the second gaming device 400B while the second player and the second gaming device 400B may be able to place a wager on the game outcome of the game at the first gaming device 400A. Additionally, the first player may be able to place an additional wager on the better of the two game outcomes at the first and second gaming devices 400A and 400B. When making a wager on the better of the two game outcomes, the amount of the wager may be higher than a wager on a single gaming device because of the better odds afforded to the player.

In other embodiments, each of the first and second players may be limited to placing only one wager, but may have several options as to where and how they place that wager. For example, a first player at a first gaming device 400A may place the wager on the game outcome at the first gaming device 400A, on the game outcome at the second gaming device 400B, or on the better of the two game outcomes at the first and second gaming devices 400A and 400B. Again, the wager on the better of the two game outcomes may require an additional wager amount or side bet to be made. In these embodiments, it may still be preferable to have the games of the gaming sessions occur substantially simultaneously so that the wagering and game outcomes are relatively synchronized.

Implementing linked gaming devices 400A and 400B to include each of the wagering possibilities above may result in each player having up to seven different possible wagers that may be made at each of the gaming devices. Table 1 below sets out each of these options (the symbol "Δ" means the better of the game outcomes from the first and second gaming devices 400A, 400B):

TABLE 1

| | Own Game Device | Other Game Device | Better Game Device | Both Game Devices | Own Device & Better | Other Device & Better | Super Combo Wager |
|---|---|---|---|---|---|---|---|
| Player 1 | 1 | 2 | Δ | 1 + 2 | 1 + Δ | 2 + Δ | 1 + 2 + Δ |
| Player 2 | 2 | 1 | Δ | 2 + 1 | 2 + Δ | 1 + Δ | 2 + 1 + Δ |

The gaming devices 400A and 400B may be configured to allow some or all of these possible wagers. Some casinos may find it more advantageous to limit the types of wagers that can be made on the gaming devices to avoid player confusion, while other casinos may choose to allow all of the different types of wagers to give players a wide variety of wagering options at the gaming devices. Having a wide variety of wagering options may make the gaming device more appealing to experienced players because of the different wagering combinations possible. Further, giving players the ability to place multiple wagers may allow players to place larger bets when they feel that a one of the linked gaming devices or both gaming devices are "hot." For example, if a player at the second gaming device 400B acquires several winning outcomes in a row, the player at the first gaming device 400A may wish to place a wager on the outcome at the second gaming device 400B since it appears that the second gaming device may be "hot" or on a winning streak. In other embodiments, the specific wagering configuration displayed may be determined after examining the player's player tracking record to determine previously chosen player selections, the experience level of the player based upon historical play records, or other information.

In some embodiments the base games at each gaming station 400A and 400B may be separate, but linked. For example, in a video slot embodiment, the gaming sessions may be configured so that games initiate substantially simultaneously so that the reel spins at each gaming device are substantially synchronized. After all of the reels have stopped, additional bonus pays may be given to the players for having similar winning combinations or for having a super line pay/super scatter pay. The similar winning combination bonuses may include situations where each player has a line pay including the same symbols (e.g., both player 1 and player 2 have a three symbol cherry pay), each player has a certain number of wins (e.g., both player 1 and 2 have 4 paying lines), each player has over a certain win amount (e.g., both player 1 and 2 have win totals over 500 credits), or each player has a certain number of symbols in a win (e.g., both player 1 and 2 have a five symbol pay). The super line pay/super scatter pay bonuses may include situations where reels from both of the gaming devices 400A and 400B are displayed on each screen and used in a win. For example, if both game outcomes are displayed next to each other on each game display 420A, 420B and the reels 3, 4, and 5 of the first game outcome (displayed on the left hand side) have a cherry symbol on a middle pay line and reels 1 and 2 of the second game outcome (displayed on the right hand side) have a cherry symbol on a middle pay line, a bonus could be given for getting a combined five symbol cherry pay on a super pay line using both game outcomes from both gaming devices 400A and 400B. In another example, if a scatter symbol, such as the boomerang symbols in FIG. 7 appeared on both displayed game outcomes a predetermined number of times (e.g., six or more times), an additional bonus may be given to each player.

In another embodiment, players could be given identical hands in video poker, but have the option to 'hold' different cards before the draw. This embodiment may enhance the competitive nature of the game since the players will be given equal initial cards; thus relying on their personal strategy of card holding to determine which player ends up with more credits. In some embodiments, the redraws for each hand may be from the same deck and hence may differ only by the specific cards held by each player. For example, if each player were initially given a hand of "Jack" "10" "4" "6" "4", and player 1 decide "Jack" and draw for the other four cards, while player 2 decided to hold the two "4"s and draw three cards, the result may look something like that illustrated in Table 2.

TABLE 2

| | Card #1 | Card #2 | Card #3 | Card #4 | Card #5 |
|---|---|---|---|---|---|
| Player #1 | Jack (held) | 10 | 4 | 6 | 4 |
| Player #2 | Jack | 10 | 4 (held) | 6 | 4 (held) |
| Player #1 - After Draw | Jack (held) | 8 | 4 | Jack | Queen |
| Player #2 - After Draw | 8 | 4 | 4 (held) | Jack | 4 (held) |

Note that the same cards in the same order were given to each player in this embodiment. That is, on the draw the cards "8" "4" "Jack" "Queen" were dealt in that order to each player. This embodiment may provide competition that varies only by each player's decisions regarding which cards to hold before the draw.

In other embodiments, however, while the initial cards may be the same for each player, the cards shown after the draw may come from separate decks. This embodiment is more similar to multi-hand poker games, such as DOUBLE PLAY POKER or TRIPLE PLAY POKER where the initial hand is the same, but each 'hand' draws from a different deck of cards. Using a similar example as above, the results of this embodiment may look something like that illustrated in Table 3.

TABLE 3

| | Card #1 | Card #2 | Card #3 | Card #4 | Card #5 |
|---|---|---|---|---|---|
| Player #1 | Jack (held) | 10 | 4 | 6 | 4 |
| Player #2 | Jack | 10 | 4 (held) | 6 | 4 (held) |
| Player #1 - After Draw | Jack (held) | 2 | Queen | 7 | Jack |
| Player #2 - After Draw | King | 4 | 4 (held) | King | 4 (held) |

Note that different cards are given to each player on the draw (although it is statistically possible in this embodiment that both players receive the same cards). That is, player 1 receives the cards "2" "Queen" "7" "Jack" on the draw while player 2 receives the cards "King" "4" "King" on the draw. This embodiment may allow for larger differences in the credits earned by each player, because each player will have different decks to draw from. Hence, even if two players hold the same cards from the initial hand, they may end up with different final hands and different credit awards.

In yet other embodiments, a video poker game may deal each player a separate or unique poker hand, display each of the dealt hands at both gaming devices, and allow at least one of the players the option of switching hands with another player prior to allowing the players to hold cards and draw replacement cards. In some of these embodiments, an indicator, such as an arrow 340 (FIG. 6) may be implemented to illustrate which of the players has the choice of switching the initially dealt poker hands. For example, if the indicator shows that player 1 has the choice to switch the initial hands, player 1 may be prompted to keep his or her existing hand, or switch cards with player 2. There may also be a time limit in which player 1 must make a decision or a default action, such as each player maintaining their current hand may occur. If player 1 chooses to switch hands with player 2, the poker hands on the respective gaming devices may be switched, after which time each player may hold cards and draw cards. In some embodiments, making the choice to switch hands may result in the indicator 340 changing to show that another player has the choice of switching hands for the next game. Thus, in the example above, the indicator 340 may point to player 2 if player 1 makes the choice to switch hands. On the other hand, if player 1 chooses to keep his or her dealt hand, the indicator may continue to point to player 1. In other words, the ability to switch hands may only change to another player when the player currently with the switching ability makes the choice to switch hands. In other embodiments, however, the indicator may switch between players each hand regardless of whether a player uses a hand switching choice or not. Alternatively, a player may get multiple choices (either a set number of turns or a number of times actually using the switch choice) before the indicator changes to another player.

If the indicator only changes to another player when the player uses the option of switching initial hands, some strategy may be employed by the player to determine when to switch hands. For example, if the player's initial hand is significantly better, about equal, or even a little worse than the other player's initial hand, that player may choose to play their own hand and use the hand-switching option during a later gaming event. However, in some embodiments, there may be a set limit on how long a player can hold the switching option. This set limit may be based on time or number of games played.

In yet another embodiment, each player may have the option to place a side bet or buy the switching option. This additional side bet may be included in a common pool or pot that is awarded to the player with the better final hand (i.e., the hand after the draw has been made). Therefore, if one player opts to buy the switching option and ends up having the better final hand, the side bet turns into a wash because they simply get the credits back from the side bet. However, if that player opts to buy the switching option and ends up not having the better hand, they lose those credits to the other player. If the gaming devices are configured so that the players are sharing a common credit meter, additional points may be risked instead of credits for the side bet. In other embodiments, the other player may place a similar side bet to "block" the side bet from the first player trying to buy the switching option. In this scenario, each player's side bet may be put in a common pot and won by the player with the better final hand. In addition, some embodiments may allow a bidding game between the two players as to whether a hand-switch occurs or not. That is, if a first player attempts to buy a switch, a second player may match or exceed the first player's side bet to prevent the switch. The first player may then be given the option to up the side bet, while the second player may again be given another chance to match. As the stakes go higher, it may become more risky for each of the players to continue betting or bidding. Additionally, in embodiments where only the highest bidding player has to front the credits (i.e., risk credits in the common pot), the bidding part of the game may become even more competitive. There may be a bid cap to prevent players from bidding too many credits and/or substantially slowing down game play. If there is a cap on the bidding or the gaming device is configured to only allow one side bet and one reciprocal side bet to block, the blocking player may have final say over whether a switch is made or not made. That is, if a first player attempts to buy a switch by placing a side bet, the second player may block the side bet by matching the first player's side bet. Here, the side bet credits may be returned to each player, may be placed in a common pot awarded to the player with a higher final hand, or may be partially returned and partially entered into a common pot awarded to the player with a higher final hand. By having at least a portion of the side bet entered into a common pot awarded to the player with the higher final hand, the first player may only attempt to switch initial hands when the hands are similarly matched. For example, if the second player has a much better hand, such as drawing an initial flush while the first player has five random cards, the first player may not risk trying to buy a switch because the second player would likely block the switch by placing a similar side bet and likely winning the first player's side bet amount if the flush ends up beating whatever the first player draws. However, if the initial hands are closer, such as the first player drawing an ace (with four lower cards) and the second player drawing a pair of low cards (with three other low cards), then the first and second player have an interesting decision to make in either placing a side bet to switch hands and/or placing a blocking side bet if a switching side bet is made. In other embodiments, a portion of the side bets made by each player may be allocated to the casino or gaming establishment.

Separate side bets may also be made regarding any aspect of gaming to increase the competition among the players. In some embodiments, a side bet pot or pool may be set up on the gaming device such that each player can wager on their respective success or even the other player's success or failure. For example, the players may be able to place a side bet on who wins a 500 credit pay first, who triggers a bonus first, who has a higher score after a predetermined amount of time, who wins a total of $100.00 first, who runs out of credits from an initial credit stake first, who gets the most hands above a straight in a predetermined amount of time, who has a better payback percentage after fifty gaming events, etc. After each player contributes to the side bet pool and an event happens that was wagered upon in the pool, the player who won the side bet may be awarded the total amount of the side bet pool. In other embodiments, however, the gaming device may deduct a small "handling" or "administrative" fee from the pool before awarding the remainder to the winning player.

Different embodiments may allow player's to "buy" a duplicate of the other player's initial hand. This additional wager or side bet may be made before the initial hands are shown, or in some embodiments, may be allowed after the initial hand is shown or a potion of the initial hand is shown. In embodiments where the side bet is allowed after the initial hand is displayed, the ability to place such a side bet to buy a duplicate hand may be restricted to situations where the initial hand does not include a winning combination of cards or a winning combination of cards above a specific value (e.g., a combination with a pay above the amount of the side bet).

Although adjacent gaming devices may be linked together to provide closer proximity to players that are friends or family members, and hence, more of a shared gaming experience, the separation of the gaming devices may, however, be advantageous in certain circumstances, such as allowing for different types of competitive bonuses. For example, bonuses requiring strategy against the other player may be advantageously implemented on these linked gaming devices that are separated from each other. For example, a bonus requiring the matching of turned-over cards (e.g., a positional-memory type of game) may be preferably implemented in gaming devices 400A and 400B having separated displays 420A, 420B where the players are competing against each other for the highest bonus score. In another example, a Battle Ship® styled bonus may be implemented where players compete against each other for varying bonus award levels. Similarly, in the linked video poker competition described above, it may be preferable to have separated displays 420A, 420B to obfuscate a poker holding strategy. In some embodiments, these gaming devices 400A and 400B may be placed back to back so that the players can still communicate while keeping the opposing player's display hidden. Pairs of these linked back-to-back gaming devices may be advertised as a competitive/friendly gaming experience.

Figure 8A:
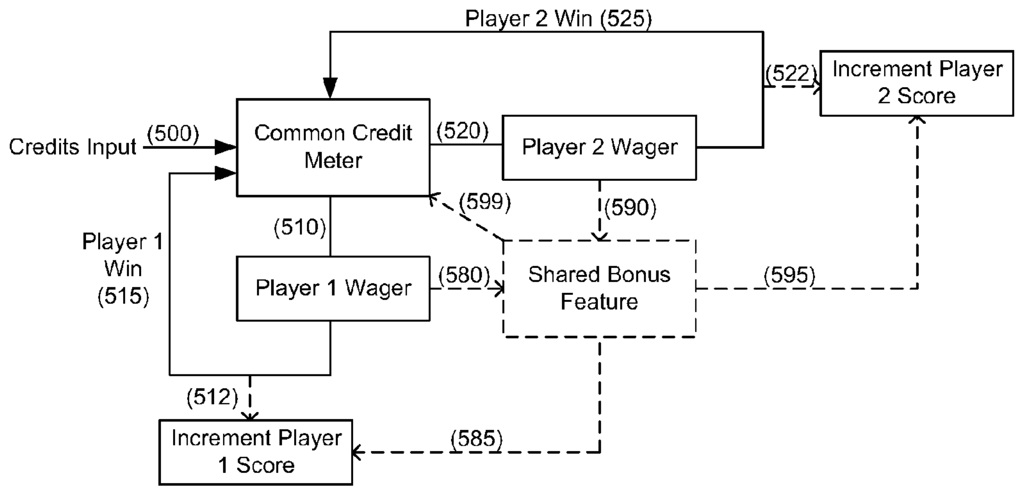
FIGS. 8A, 8B, and 8C are flow diagrams of credit sharing procedures according to embodiments of the invention.
Figure 8B:
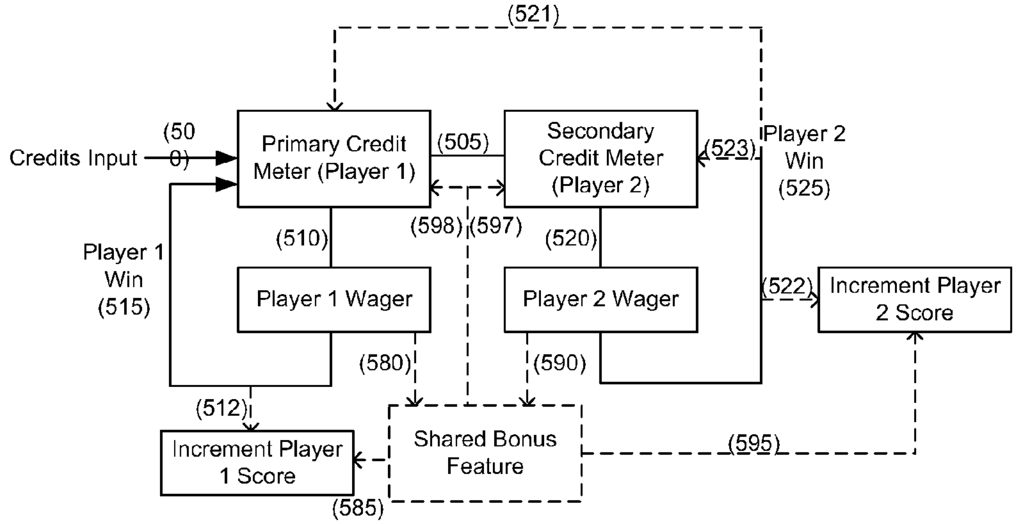
Figure 8C:
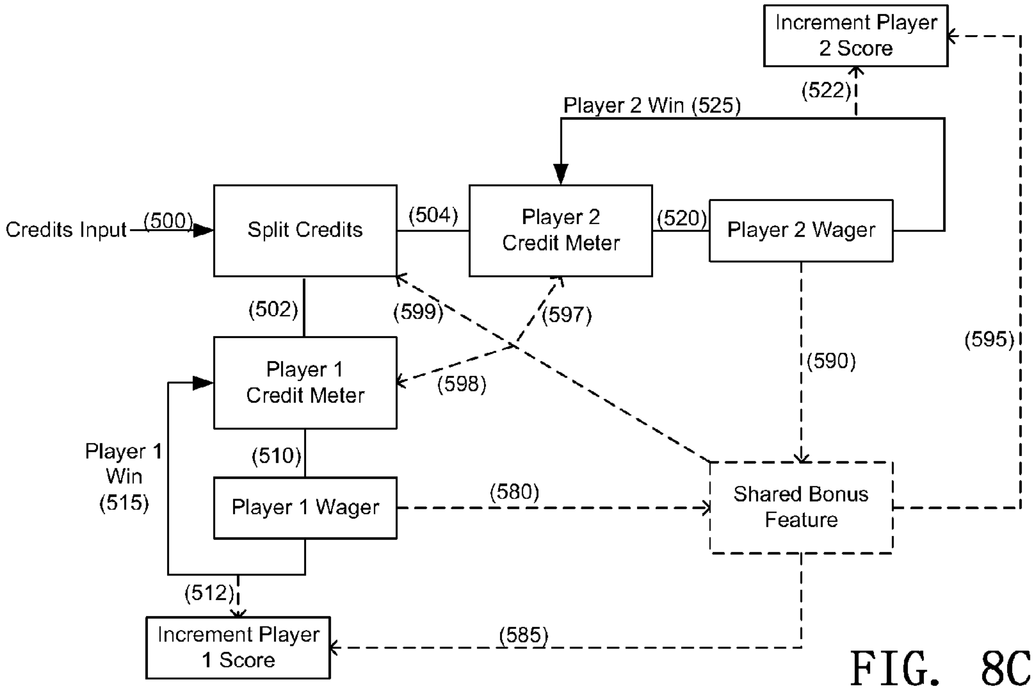

FIGS. 8A, 8B, and 8C are flow diagrams of credit sharing procedures according to embodiments of the invention. FIG. 8A illustrates a credit sharing procedure utilizing a common credit meter, FIG. 8B illustrates a credit sharing procedure utilizing primary and secondary credit meters, and FIG. 8C illustrates a credit sharing procedure utilizing separate credit meters.

Referring to FIG. 8A, the credit sharing procedure utilizing a common credit meter places credits input into one or both of the gaming device (500) in the common credit meter that is displayed at both gaming devices. When player 1 places a wager (510), the amount of the wager is deducted from the common credit meter. If the wager placed by player 1 does not result in a win, the credits are simply forfeited in a similar manner to conventional gaming devices. If player 1, however, receives a winning combination in his or her game, the award won by player 1, or a portion thereof, is transferred back (515) to the common credit meter. If the gaming device is configured to record a player score, a winning gaming session based on player 1's wager may also increment player 1's score (512).

Similarly, when player 2 places a wager (520), the amount of the wager is deducted from the common credit meter. If the wager placed by player 2 does not result in a win, the credits are again simply forfeited. If player 2, however, receives a winning combination in his or her game, the award won by player 2, or a portion thereof, is transferred back (525) to the common credit meter. If the gaming device is configured to record a player score, a winning gaming session based on player 2's wager may also increment player 2's score (522).

If the gaming devices are configured to include shared bonuses (i.e., cooperative bonuses or dual-player interactive bonuses) where both player 1 and player 2 are eligible to receive credits and score points, any credits won from these bonuses will be transferred (599) to the common credit meter and the player scores will be incremented accordingly (585/595). These shared bonuses can be triggered during a gaming session wagered on by either player 1 (580) or player 2 (590).

As discussed above, a credit sharing procedure utilizing a common credit meter may be preferable in embodiments where players are taking turns wagering on a common game (FIG. 6). In addition, a common credit meter may be preferable where the two players are playing with jointly-owned money, such as with a husband and wife. A common credit meter may also foster a more cooperative player environment where each player is rooting for the other to do as well as possible. This shared gaming experience is much more difficult to satisfyingly achieve with conventional gaming devices. Even if separate player scores are kept, any competition will be friendlier because both players are working towards the common goal of increasing the number of credits on the common credit meter as much as possible.

In some embodiments, some or all of the awards won by each player may be transferred to non-shared credit meters. For example, suppose player 1 places a 5 credit wager from the common credit meter and wins 100 credits. Fifty percent of the award may be transferred to the common credit meter and the other fifty percent of the award may be transferred to a credit meter associated with player 1. In some of these embodiments, each player may continue placing wagers from the common credit meter and sharing a portion of any awards won, or may place a wager from their associated credit meter and keep all awards won. Many variations exist as to how the credits awarded may be apportioned, which may be dependent, in part, on from which meter the wagers were made.

Referring to FIG. 8B, the credit sharing procedure utilizing the primary and secondary credit meters places credits input into one of the gaming devices (500) in the primary credit meter. In the embodiment illustrated in FIG. 8B, the primary credit meter is attributed to player 1 at the first gaming device. In other embodiments, however, the primary credit mater may be attributed to any of the players. Here, player 1 may be thought of as the pilot and player 2 as the copilot. That is, player 1 may decide how many credits to pass along to the secondary credit meter (505), which is used by player 2 on the second gaming device.

In operation, wagers placed by player 1 are deducted from the primary credit meter (510) and any awards won by player 1 during the gaming session will be credited back to the primary credit meter (515). In addition, these wins may increment player 1's score meter (512). Wagers placed by player 2 are deducted from the secondary credit meter (520). In some embodiments, awards won by player 2 during the gaming session will be credited back to the secondary credit meter (523). In other embodiments, however, these awards won by player 2 may be credited back to the primary credit meter (521). In both type of embodiments, these wins by player 2 may increment player 2's score meter (522).

If the gaming devices are configured to include shared bonuses (i.e., cooperative bonuses or dual-player interactive bonuses) where both player 1 and player 2 are eligible to receive credits and score points, credits won that are attributed to player 1 are transferred to the primary credit meter (598). Credits won in the shared bonus that are attributed to player 2 may, depending on the embodiment of the gaming device, be transferred to the secondary credit meter (597) or to the primary credit meter (598). The player scores, however, may be incremented according to each of the player's performance/results from the bonus (585/595). As mentioned above, these shared bonuses can be triggered during a gaming session wagered on by either player 1 (580) or player 2 (590).

This credit sharing procedure illustrated in FIG. 8B may be preferable when all money input into the gaming device belongs to the primary or pilot player. For example, if one of two friends has already lost all of his or her daily budgeted money, the other friend may direct some of his or her credits to the secondary credit meter at the second gaming device so that the friends can still have a shared gaming experience while the friend with the remaining money controls the amount loaned or given to the other friend. This situation may be similar to a craps player allowing another player to place a "gift" $20 bet for having a favorable streak of dice rolling.

Referring to FIG. 8C, the credit sharing procedure utilizing separate credit meters automatically splits credits input into either of the gaming devices (500) between a first credit meter (502) at the first gaming device and a second credit meter (504) at the second gaming device. In the embodiment illustrated in FIG. 8C, the first credit meter is attributed to the player 1 and the second credit meter is attributed to player 2. In other embodiments, however, this attribution can be reversed or changed for additional players playing on additional gaming stations. The gaming devices may be configured to split the credits equally between the players or the players may select how the credits should be split. For example, if player 1 contributes $100.00 and player 2 contributes $20.00, the players may set their gaming devices to split the credits at a 5:1 ratio for player 1. In other embodiments, the gaming devices may simply add credits input on the first gaming device to increment the first credit meter (502) and add credits input on the second gaming device to increment the second credit meter (504). In these embodiments, the gaming devices may track the amounts contributed by each player and automatically split awards according to the tracked contribution ratio.

In operation, wagers placed by player 1 are deducted from the first credit meter (510) and any awards won by player 1 during the gaming session will be credited back to the first credit meter (515). In addition, these wins may increment player 1's score meter (512). Similarly, wagers placed by player 2 are deducted from the second credit meter (520) and any wins by player 2 during the gaming session will be credited back to the second credit meter (525). In addition, these wins by player 2 may increment player 2's score meter (522).

If the gaming devices are configured to include shared bonuses (i.e., cooperative bonuses or dual-player interactive bonuses) where both player 1 and player 2 are eligible to receive credits and score points, credits won that are attributed to player 1 may be transferred to the first credit meter (598). Credits won in the shared bonus that are attributed to player 2 may be transferred to the second credit meter (597). In shared bonuses where players share a final award, the final award may be automatically split (599) between the first credit meter (502) and the second credit meter (504) according to the split-ratio established earlier. The player scores, however, may be incremented according to each of the player's performance/results from the bonus ((585/595). As mentioned above, these shared bonuses can be triggered during a gaming session wagered on by either player 1 (580) or player 2 (590).

This credit sharing procedure may be advantageous where players want to have some sharing of credits while they are playing separate base games with separate credit meters, but still want to participate in shared bonuses that split up or divide shared credits based on credits initially input into the gaming devices. This may be useful, for example, when a husband and wife want to play different types of games, but still want to use shared credits for any bonuses that can be shared between the separate gaming devices that they are playing.

When cashing out credits using the ticket printer 38 (FIG. 1) or coin hopper (not shown), each of these various embodiments of the gaming device may be handled differently. For embodiments where the players share a common credit meter (FIG. 8A), a single ticket may be printed from one of the gaming devices to reflect the amount shown by the common credit meter. In embodiments where there is a primary credit meter and a secondary credit meter (FIG. 8B), a single ticket could be printed out for the combined total of the primary and secondary credit meters at the first or primary gaming deice, or individual tickets for each of the credit meters may be printed at the respective gaming devices. In embodiments where there is a first credit meter and a second credit meter, individual tickets for each of the credit meters may preferably be printed at each of the respective gaming devices.

Figure 9:
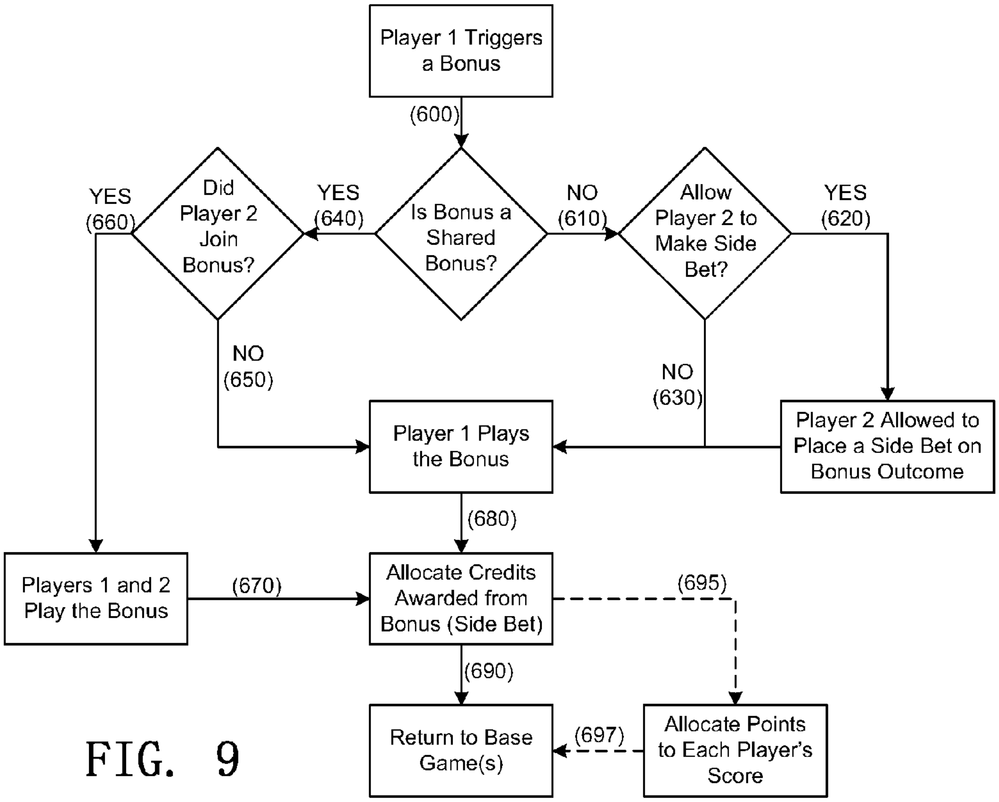
FIG. 9 is a flow diagram of a bonus procedure according to embodiments of the invention.

FIG. 9 is a flow diagram of a bonus procedure according to embodiments of the invention.

Referring to FIG. 9, a bonus game is initiated (600) by a bonus trigger. In the embodiment illustrated in FIG. 9, a bonus game has been initiated (600) because player 1 has triggered a bonus on the first gaming device. Player 2, however, may also initiate a bonus game (600) by triggering a bonus on the second gaming device, or one of the gaming devices (or gaming server) may randomly trigger a bonus for either player. After the bonus has been triggered, the gaming device determines if the bonus is a shared bonus. If the bonus is a shared bonus (640), the gaming device next determines whether player 2 has joined the bonus. That is, with some embodiments having a shared bonus, the non-triggering player may decide not to participate in the shared bonus (particularly if the non-triggering player is at risk of losing credits). In these situations, the triggering player will play the bonus by himself or herself, or a single-player bonus may be substituted with a similar average payback (650). If, on the other hand, the second player chooses to join the shared bonus (660), the shared bonus is played and any credits awarded during the bonus will be allocated to each of the players (670).

Returning to the determination of bonus type, if the triggering gaming device determines that the bonus is not a shared bonus (610), the gaming device next determines if player 2 is allowed to make a side bet on the bonus. In some embodiments, side bets from a non-triggering player may increase the friendly competition among the players. For example, a side bet may be made that player 1 does not reach a certain award threshold. In another example, a side bet may be made such that player 1 will only make two successful picks before picking a bonus stopping symbol. Various other side bets may be presented to the second player based on the performance or luck of the first player. The side bet may deduct a certain number of credits from the second player's credit meter (or from the common credit meter as a form of an insurance bet). If the second player is allowed to place a side bet (620), the first gaming device determines the form and amount of the side bet made by the second player at the second gaming device and then allows player 1 to play the bonus (630). If the triggering gaming device determines that a side bet is not available, player 1 begins play of the bonus (630).

After player 1 has completed the bonus (680), any awards from the bonus including side bet awards are determined and allocated to the proper credit meters. After the credit allocation has been completed, each of the gaming devices returns to the one or more base games (690) on the gaming devices. If player scores are being kept, points attributable to each player may be incremented on the respective player point meters (695) before returning to the base games (697).

Figure 10A:
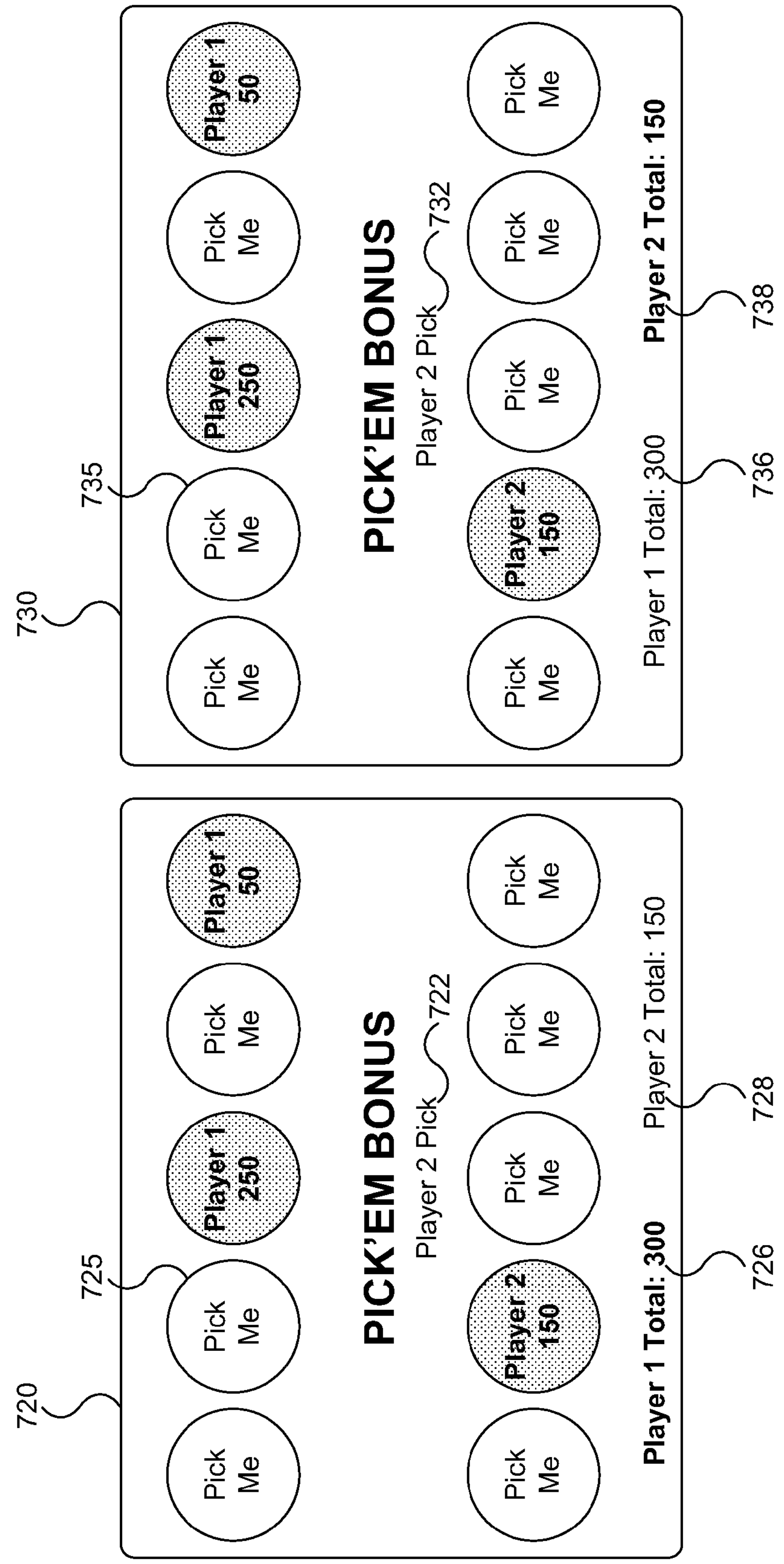
FIGS. 10A and 10B are detail diagrams of bonus displays according to embodiments of the invention.
Figure 10B:
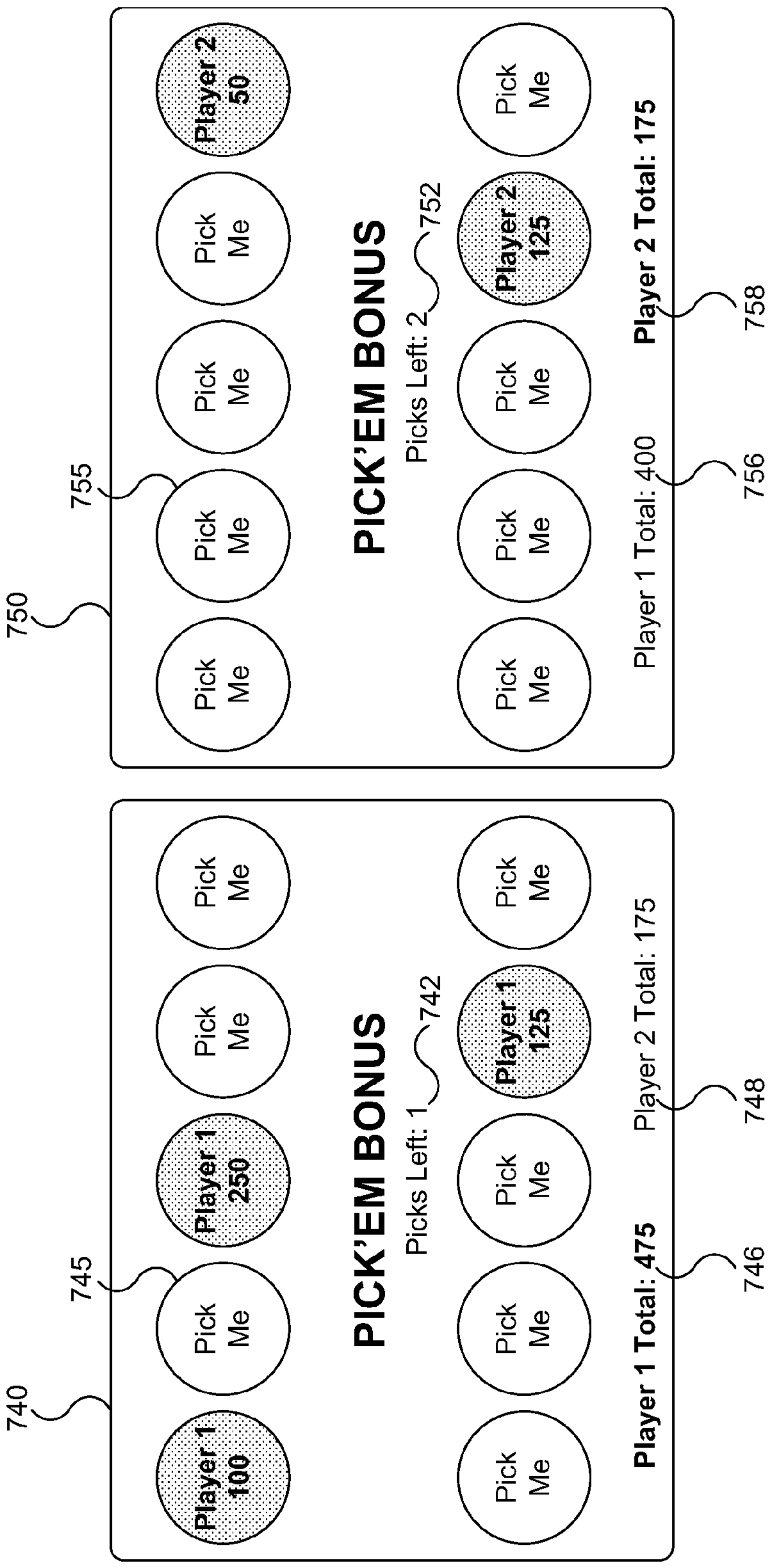

FIGS. 10A and 10B are detail diagrams of bonus procedures according to embodiments of the invention. FIG. 10A illustrates a bonus procedure utilizing a common bonus display, while FIG. 10B illustrates bonus procedures utilizing separate bonus displays.

Referring to FIG. 10A, the bonus implemented on the first display 720 and the second display 730 are substantially similar. That is, actions taken on one of the first or second displays 720, 730 appear on the other one of the displays. This allows the players to directly compete for a better bonus score while monitoring the other player's actions and progress. In this embodiment, player 1 and player 2 are presented a screen of ten selectable objects 725/735 and take turns choosing available selectable objects 725/735. A player turn indicator 722/732 may be used to keep track of which player has the next pick. Each of the first and second displays 720, 730 may include player score meters 726, 728, 736, and 738 that respectively keep the total score for player 1 726/736 and the total score for player 2 718/738. The first display 720 may highlight the first player's score 726 since player 1 is playing on the first display 720. Similarly, the second display 730 may highlight the second player's score 738 since player 2 is playing on the second display 730.

Each player may be allowed to choose a predetermined number (e.g., three) of the selectable objects 725/735 or the bonus may continue until a "stop bonus" symbol is chosen or all of the objects 725/735 have been chosen. The player who triggered the bonus may be awarded the first selection. Once the first player makes a selection, a value is revealed for that selection on both bonus screens 720, 730 and the selected object 725/735 becomes unselectable for both players. Here, each object 725 on the first display 720 corresponds to similarly located object 735 on the second display 730. Thus, if player 1 selects the upper middle object on the first display 720, which is revealed to be worth 250 credits, the revealed object and credit amount is also shown on the second display 730. The second player may then select one of the remaining nine objects. Alternate selections are made until both players have exhausted their three selections. Each value corresponding to a player's selection may be added to that player's score meter 726, 728, 736, and 738. At the end of the bonus the player with the larger value on their player score meter 726, 728, 736, and 738 may be indicated as winning the bonus competition. In some embodiments, each of the player score meter values may be added to the player's respective credit meter or to the common credit meter. However, in other embodiments, only the winning player's win meter is added to that player's credit meter or the common credit meter.

Referring to FIG. 10B, the illustrated bonus is a shared bonus that is implemented using separate bonus displays 740, 750. As with the embodiment described with reference to FIG. 10A, each display 740, 750 shows ten selectable objects 745, 755. In this embodiment, however, actions made on one display do not necessarily appear on the other display. In some embodiments, the selectable objects 745, 755 do not directly correspond to one another. That is, similarly positioned selectable objects on each display are not necessarily associated with the same value or outcome. In other embodiments, however, each of the selectable objects 745, 755 do correspond to each other, but the selection of one object on one of the bonus displays does not reveal the selection on the other bonus display. This way, players can directly compete against each other without knowledge of what objects the other person has selected.

In this embodiment, each player makes selections independent of the other player. Thus, as shown in FIG. 10B player 1 has made three selections on the first display 740 with a total of 475 credits that is reflected on the player score meter 746 on the first display 740 and is reflected on the player score meter 756 on the second display 750. A bonus pick indicator 742 on the first display 740 may indicate how many picks player 1 has left in the bonus, which in this case is 1 remaining pick. Player 2, on the other hand, has only made two selections on the second display 750 with a total of 175 credits that is reflected on the player score meter 748 on the first display 740 and reflected on the player score meter 758 on the second display 750.

In this embodiment, each player may be given a predetermined number of selections (e.g., four selections) or each player may continue choosing selectable objects 745, 755 until a "stop bonus" symbol is selected. In some embodiments, the same distribution of bonus values is given to both players, although not arranged behind the same selectable objects 745, 755, so that the only variable in the player's scores is based on the particular selections made by each player. In other embodiments, a script may be used to determine the order of the selections made by each player. However, in the illustrated embodiment, each selectable object 745, 755 has a similar outcome associated with it, as indicated by the selected object on the lower right that is worth 125 points/credits on each display 740, 750.

Figure 11:
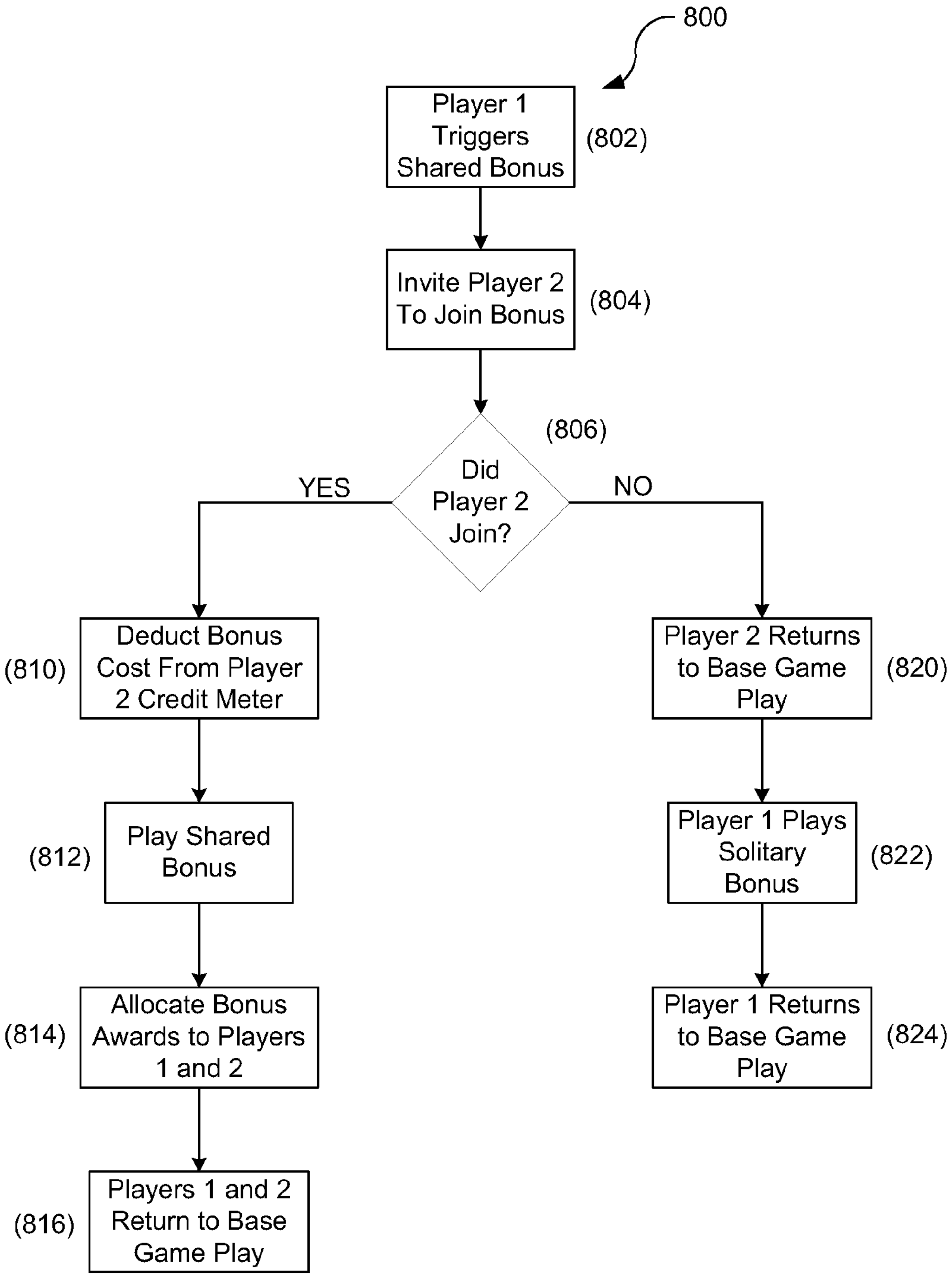
FIG. 11 is a flow diagram of a bonus procedure according to embodiments of the invention.

FIG. 11 is a flow diagram of a bonus procedure according to embodiments of the invention.

Referring to FIG. 11, flow 800 begins when player 1 triggers a shared bonus on a first gaming device in process (802). As discussed above, this bonus may be triggered based on a game outcome, triggered as a result of game play, or triggered as a mystery bonus. In process (804), player 2, playing at a second gaming device connected or linked to the first gaming device, is invited to join the shared bonus. This invitation may be based on several conditions being satisfied. First, player 2 must have indicated that they are willing to allow invitations to participate in shared bonuses. In some embodiments, the second gaming device may be affirmatively linked to the first gaming device for an invitation to be made. In other embodiments, the second gaming device may be part of a common bank of games or part of a common game theme or style for an invitation to be made. Although this embodiment indicates that only one other player (player 2) receives an invitation, in other embodiments multiple invitations may be sent to multiple players at multiple gaming devices. For example, if the first gaming device is part of a bank of games that advertises all games at the bank are eligible bonus, invitations may be sent to each gaming device at the bank that is currently being played.

In some embodiments, player 2 must have sufficient credits on their credit meter to cover an entry cost of the shared bonus. In other embodiments, an invitation will be made to player 2 even if they do not have sufficient credits on their credit meter to cover the entry cost of the shared bonus so that player 2 has the opportunity to add additional credits to the second gaming device to enter the shared bonus. In some embodiments, the second gaming device will only allow an invitation to participate in a shared bonus from another gaming device if player 2 is maintaining a predefined minimum rate of play. These embodiments may check for a minimum rate of play to ensure that a player is not a bonus troll; that is, a player playing the base game very slowly and/or playing with a minimum wager in hopes of mainly playing the shared bonuses, which may have a higher rate of play.

In operation, process (804) may not present the invitation to player 2 until player 2 has completed a current game. The invitation may be provided in a dialog type box over the game display similarly to the embodiment shown in FIG. 5A. Alternatively, the invitation may come up as a flag or an alert on the game display, on a secondary display, or on a separate notification device. In addition, a noise or sound may accompany the invitation to further alert player 2 to the invitation. The invitation may indicate a joining cost, if any, to participate in the shared bonus.

After the invitation has been sent, the first gaming device or the gaming system determines if player 2 has elected to join the shared bonus in process (806). If player 2 does elect to join the shared bonus, the cost of joining, if any, is deducted from player 2's credit meter in process (810). As discussed above, in embodiments where player 2 does not have sufficient credits to join the shared bonus when he or she receives the invitation, player 2 may add credits to the gaming device to cover the cost of joining the shared bonus. The addition of credits to cover the cost of joining the bonus may be necessary before the invitation can be accepted.

The shared bonus is played in process (812). After the bonus is completed, process (814) allocates the credits or other prizes won during the bonus to player 1 and player 2. For example, if player 1 wins 100 credits during the shared bonus and player 2 wins 150 credits during the shared bonus, process (814) may include generating signals to roll up the credit meter on the first gaming device with 100 credits and roll up the credit meter on the second gaming device with 150 credits. After the awards have been distributed, game play on the first and second gaming device may return to base game play in process (816).

When player 2 declines participation in the shared bonus, player 2 returns to base game play on the second gaming device in process (820). Player 1 then plays the bonus in a solitary mode in process (822). After the bonus is completed, player 1 returns to base game play in process (824).

FIGS. 12A and 12B are detail diagrams of a gaming device according to embodiments of the invention.

Referring to FIG. 12A, gaming device 900A includes a display 920 and a player interface panel having multiple game buttons 932 and at least one game initiation button 933. The game display 920 includes a portion that shows game play of the game, such as multiple reels, and one or more soft buttons 929 that allow a player to interact with the display. In FIG. 12A the game portion displays five video reels representing the player's game. In this case, the player has been identified as "Jane." Jane has linked the gaming device 900A to a second gaming device played by her friend "John." The gaming display 920 shows both John's points 960A and Jane's points 960B. As discussed above, these point totals may represent player point totals or game-specific points earned during the linked game session based on game play. The display 920 also includes game information 921 that provides information to the player. In this illustrated embodiment, the game information is giving Jane information about a symbol combination that triggers a bonus and is notifying her that she is currently linked to John.

The game display 920 also includes a soft button 995 that allows Jane to break the game link between her gaming device and John's gaming device. Jane may wish to break this link prior to cashing out, changing games, or if she simply wants to take a break from linked gaming. Although in some embodiments the link between the gaming devices will be broken when one of the players cashes out, runs out of credits, or otherwise ends their game session, the End Link soft button 995 may allow a player to take an affirmative action to break the link.

The game display 920 also includes a miniature or size-reduced display window of John's game 970. Although this miniature display 970 is shown on the game display 920 in this embodiment, a copy of a linked game may be shown on a secondary screen on the gaming device, or on a display located near the gaming device. The miniature display 970 may allow Jane to monitor John's gaming experience and hence make the gaming experience more of a shared experience instead of a solitary action. If the miniature display 970 becomes too distracting, Jane may eliminate or hide the miniature display 970 by activating the Hide Game soft button 978. Once hidden, another button (not shown) may be activated to re-display the miniature display window 970 of John's game. In addition, if Jane is getting bored playing her own game she may activate the Switch Screens soft button 976 to enlarge John's game. Activating the Switch Screens soft button 976 may change the game display 920 between the display shown in FIG. 12A and the display shown in FIG. 12B.

Referring to FIG. 12B, once the Switch Screen soft button has been activated, Jane's game (the primary game of the gaming device 900A) is reduced in size or minimized to a miniature game display 980 in the upper right-hand corner of the game display 920. Substantially simultaneously, the previously minimized display window 970 of John's game is now maximized on the main game portion of the display 920. The game information 921 now informs Jane that she is viewing the linked game (John's game), and that she can use the game buttons 932 on the player interface panel 930 to wager on John's game. That is, Jane may choose how many lines and credits per line she would like to wager on John's game. In some embodiments, Jane may press the Repeat Bet button 933 to confirm this wager for each of the games John plays. In these embodiments, the activation of the Repeat Bet button 933 does not initiate a game on John's game device. Rather, it confirms that Jane would like to place the indicated wager on the next game that John initiates on the second gaming device. In other embodiments, however, Jane may only have to indicate a wager configuration and a wager according to this configuration will be automatically placed on John's game each time John initiates another game.

In addition, the gaming device 900B may allow John to place a wager on how John is going to fair in his game play. Here, Jane may press the Loses button 985A to wager that John will receive a losing outcome on the next game he plays. Jane may alternatively press the Wins button 985B to wager that John will receive a winning outcome on the next game he plays. Next to these buttons, the gaming device 900B may indicate the pays for these wagers. Here, the gaming device 900B may determine that the hit frequency of the linked second game (John's game) is about 35%. Thus, it will pay 1 credit for every three credits bet that John will lose and will pay 2.5 credits for every credit wagered that John will win. Thus, the gaming device will statistically be making money on either of these bets in the long run. Jane may indicate a bet amount by using the game buttons 932 on the player interface panel. For example, if Jane wants to place a two credit bet that John will receive a winning outcome on this next game, Jane may press the Bet 2 Per Line game button 932 and the Wins soft button 985B. In other embodiments, additional buttons may be presented on the display 920 to allow for Jane to place these types of wagers more easily. In other embodiments, the display on the physical game buttons 932 may be dynamically altered to reflect different types of wagers. The game pays/odds associated with each of these wagers may be dynamically updated based on the wager configuration that John is using for a particular game or gaming session. In some embodiments, other types of wagers may be available, such as betting that John receives a bonus, loses three games in row, etc.

While Jane is monitoring and/or wagering on John's game as shown in the display 920 shown in FIG. 12B, she may be able to continue to play her own gaming device. In some embodiments, Jane may be able to put her game on auto-play so that it can play automatically in the miniature display window 980 while she places additional wagers on John's game. In other embodiments, Jane may be able to play her game in a Fast Forward style format in the miniature window 980 where losses are quickly shown and games are re-initiated until a winning outcome or an outcome meeting a predefined criterion is reached. When such an outcome is received, the display of Jane's game may quickly maximize out of the miniature display window 980 to the full game display to show the winning or preferred outcome in a larger format to emphasize the win. The Fast Forward concept is discussed fully in patent application Ser. No. 12/204,633, filed Sep. 4, 2008, entitled GAMING DEVICE HAVING VARIABLE SPEED OF PLAY (herein referred to as "the '633 application"), which is hereby incorporated herein by reference.

Jane may also switch back to her own game at any time by pressing the Switch Screens button 976. Here, the gaming display may revert back to the display format shown in FIG. 12A. As discussed above, the embodiment shown in FIGS. 12A and 12B are presented for illustrative purposes and clarity. However, there are many other formats and variations in features that may be present in other embodiments where a player may monitor a linked game and even participate or back bet on the other linked game.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A method of sharing game play on a plurality of gaming devices, the method comprising:

receiving a wager via the gaming device from a first player at a first gaming device;

receiving a wager via the gaming device from a second player at a second gaming device;

displaying a first video poker hand dealt from a first card deck on a display at the first gaming device;

displaying a second video poker hand dealt from a second card deck on a display at the second gaming device;

displaying an indicator to designate one of the first or second player to provide an option of switching a dealt video poker hand with a video poker hand dealt to the other one of the first or second player;

awarding prizes associated with a first gaming outcome displayed at the first gaming device; and awarding prizes associated with a second gaming outcome displayed at the second gaming device.

2. The method of claim 1, further comprising awarding prizes associated with a combined gaming outcome of the first gaming outcome and the second gaming outcome.

3. The method of claim 1, wherein the first video poker hand and the second video poker hand include identical poker hands.

4. The method of claim 3, wherein an order of draw cards for each of the first video poker hand and the second video poker hand is identical.

5. The method of claim 3, wherein draw cards for the first video poker hand and the second video poker hand are drawn from separate card decks.

6. The method of claim 1, further comprising providing the first player an option of switching the first video poker hand dealt with the second video poker hand dealt.

7. The method of claim 1, wherein the indicator alternatively designates one of the first or second player to provide the switching option.

8. The method of claim 1, wherein the indicator designates the other one the first or second player after an initially designated player utilizes the switching option.

9. The method of claim 1, wherein the designated one of the first or second player must place a side bet to utilize the switching option.

10. The method of claim 9, wherein an amount of the side bet is awarded to one of the first or second player that receives a better final poker hand.

11. The method of claim 1, further comprising:

providing each of the first player and the second player an option to switch an initially dealt video poker hand with another player, the switching option requiring a first side bet to be placed to utilize the option;

providing each of the first player and the second player with an option to block the switch of the initially dealt video poker hands, the blocking option requiring a second side bet to be placed to utilize the option.

12. The method of claim 11, wherein the first and second side bets are placed in a common pot, the common pot awarded to one of the first or second player that receives a better final poker hand.

13. The method of claim 1, wherein the wager received from the first player at the first gaming device is on the second gaming outcome displayed at the second gaming device.

14. The method of claim 1, wherein the wager received from the first player at the first gaming station is on the both the first gaming outcome displayed at the first gaming device and the second gaming outcome displayed at the second gaming device.

15. The method of claim 1, wherein the wager received from the first player at the first gaming device is on a better one of the first and second gaming outcomes respectively displayed at the first and second gaming devices.

* * * * *